(12) United States Patent
Strauss et al.

(10) Patent No.: US 8,932,451 B2
(45) Date of Patent: Jan. 13, 2015

(54) INTEGRATED CRUDE REFINING WITH REDUCED COKE FORMATION

(75) Inventors: Ramon A. Strauss, Herndon, VA (US); Stephen Harold Brown, Annandale, NJ (US); Donald E. Stratton, Kingwood, TX (US); Stefan Maria Willy Ceulemans, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 177 days.

(21) Appl. No.: 13/597,504

(22) Filed: Aug. 29, 2012

(65) Prior Publication Data

US 2013/0161236 A1 Jun. 27, 2013

Related U.S. Application Data

(60) Provisional application No. 61/529,565, filed on Aug. 31, 2011.

(51) Int. Cl.
*C10G 65/14* (2006.01)
*C10G 65/00* (2006.01)
(Continued)

(52) U.S. Cl.
CPC .......... *C10G 65/12* (2013.01); *C10G 2300/205* (2013.01); *C10G 2300/202* (2013.01); *B01J 37/0207* (2013.01); *C10G 49/02* (2013.01); *B01J 35/1038* (2013.01); *B01J 37/20* (2013.01); *B01J 37/0201* (2013.01); *C10G 2300/301* (2013.01); *C10G 49/22* (2013.01); *C10G 67/0454* (2013.01); *B01J 23/883* (2013.01); *B01J 35/1042* (2013.01); *C10G 2300/44* (2013.01); *C10G 45/04* (2013.01); *B01J 23/74* (2013.01); *B01J 23/8885* (2013.01); *B01J 35/1061* (2013.01); *B01J 35/023* (2013.01); *C10G 47/02* (2013.01)
USPC ................... 208/78; 208/58; 208/80; 208/92; 208/309; 208/347

(58) Field of Classification Search
CPC ...... B01J 23/74; B01J 23/883; B01J 23/8885; B01J 35/023; B01J 35/1038; B01J 35/1042; B01J 35/1061; B01J 37/0201; B01J 37/0207; B01J 37/20; C10G 2300/202; C10G 2300/205; C10G 2300/301
USPC .......... 208/58, 78, 80, 92, 308, 309, 347, 361
See application file for complete search history.

(56) References Cited

U.S. PATENT DOCUMENTS 2,859,169 A 11/1958 Herman et al.
3,023,158 A 2/1962 Watkins et al.
(Continued)

FOREIGN PATENT DOCUMENTS

EP 0462823 A1 12/1991
EP 0635555 A2 1/1995
(Continued)

OTHER PUBLICATIONS

The International Search Report and Written Opinion of PCT/US2012/052983 dated May 7, 2013.
(Continued)

*Primary Examiner* — Walter D Griffin
*Assistant Examiner* — Derek Mueller
(74) *Attorney, Agent, or Firm* — Bruce M. Bordelon; Chad A. Guice (57) ABSTRACT

Methods are provided for processing crude oil feeds with reduced or minimized energy usage, reduced or minimized numbers of processing steps, improved allocation of hydrogen, and reduced or minimized formation of low value products. The methods reduce or minimize the use of vacuum distillation, and in many aspects reduce or minimize the use of both atmospheric and vacuum distillation. The methods also reduce or minimize the use of coking and fluid catalytic cracking processes.

20 Claims, 3 Drawing Sheets

(51) Int. Cl.
| | |
|---|---|
| C10G 65/12 | (2006.01) |
| B01D 3/06 | (2006.01) |
| C10G 7/00 | (2006.01) |
| B01J 37/02 | (2006.01) |
| C10G 49/02 | (2006.01) |
| B01J 37/20 | (2006.01) |
| C10G 49/22 | (2006.01) |
| C10G 67/04 | (2006.01) |
| C10G 45/04 | (2006.01) |
| B01J 23/74 | (2006.01) |
| B01J 35/02 | (2006.01) |
| C10G 47/02 | (2006.01) |
| B01J 35/10 | (2006.01) |
| B01J 23/883 | (2006.01) |
| B01J 23/888 | (2006.01) |

(56) References Cited

U.S. PATENT DOCUMENTS

| | | | |
|---|---|---|---|
| 3,617,501 | A | 11/1971 | Eng et al. |
| 3,617,525 | A | 11/1971 | Moritz et al. |
| 3,817,853 | A | 6/1974 | Folkins |
| 3,891,538 | A | 6/1975 | Walkey |
| 4,247,385 | A | 1/1981 | Gorin |
| 4,302,323 | A | 11/1981 | Chen |
| 4,421,633 | A | 12/1983 | Shih et al. |
| 4,434,045 | A | 2/1984 | Vernon et al. |
| 4,483,761 | A | 11/1984 | Paspek |
| 4,548,709 | A | 10/1985 | Bowes et al. |
| 4,585,546 | A | 4/1986 | Bowes et al. |
| 4,808,298 | A | 2/1989 | Peck et al. |
| 4,857,168 | A | 8/1989 | Kubo et al. |
| 5,496,464 | A | 3/1996 | Piskorz et al. |
| 5,851,381 | A * | 12/1998 | Tanaka et al. ............... 208/210 |
| 5,897,769 | A | 4/1999 | Trachte et al. |
| 6,063,266 | A | 5/2000 | Grande et al. |
| 6,123,835 | A | 9/2000 | Ackerson et al. |
| 6,841,062 | B2 | 1/2005 | Reynolds |
| 7,691,256 | B2 | 4/2010 | Montanari et al. |
| 2005/0241993 | A1 | 11/2005 | Lott et al. |
| 2006/0289338 | A1 | 12/2006 | Gueret et al. |
| 2010/0025291 | A1 | 2/2010 | Shafi et al. |
| 2010/0025293 | A1 | 2/2010 | Kressmann et al. |

FOREIGN PATENT DOCUMENTS

| | | |
|---|---|---|
| EP | 1600491 A1 | 11/2005 |
| JP | 54015907 A | 2/1979 |
| WO | 9429406 A1 | 12/1994 |
| WO | 2006102534 A2 | 9/2006 |
| WO | 2009019954 A1 | 12/2009 |

OTHER PUBLICATIONS

Solari, Rodolfo B., "Asphaltene Hydroconversion", Asphaltenes and Asphalts 2, Developments in Petroleum Science, 40 B, (2000), Elsevier Science B.V.

Mochida, Isao; Zhao, Xing-Zhe; Sakanishi, Kinya, "Catalytic Two-Stage Hydrocracking of Arabian Vacuum Residue at a High Conversion Level without Sludge Formation", Ind. Eng. Chem. Res. (1990), pp. 334-337, vol. 29.

Chevron Lummus LC-FINING, www.CBI.com/lummus-technology.

Landau, M.V., "Deep hydrotreating of middle distillates from crude and shale oils", Catalysis Today (1997) pp. 393-429.

Epperly, W.R., "EDS Coal Liquefaction Process Development: Phase V. Final Technical Progress Report", US Department of Energy, (1984), vol. 1.

Davis, Harold; Fox, Jerry, "Evaluation of Heavy Oil Upgrading/Refining Process Designs for HRI Dynacracking and UOP Aurabon Process", US Department of Energy, (1984), Final Report.

Walker, A., "Gulf Canada Donor Refined Bitumen (DRB) Process", The American Society of Mechanical Engineers, (1984), New York, NY.

Kondo, T.; Souza, W.F.; Sakuran, H.T., "Hydrocracking of Brazilian Marlim Vacuum Residue using a Natural Limonite Ore as Catalysts—Effect of Solvents on Reaction Performance", ACS Division of Petroleum Chemistry, Inc. Preprints (Sep. 2003) pp. 143-144, vol. 48.

Tokyo University Agric. Technol., Tamagawa Univ., "Hydrocracking of Taching Crude Oil- 1. THe Effect of Hydrogen Transfer Solvents", J. Japan Petrol. Inst., (1983), pp. 211-215, vol. 26, Iss. 3.

Ancheyta, J.; Betancourt, G.; Marroquin, G.; Centeno, G.; Castaneda, L.C.; Alonso, F.; Munoz, J.A.; Gomez, MA. T.; Rayo, P., "Hydroprocessing of Maya heavy crude oil in two reaction stages", Applied Catalysis A: General 223 (2002) pp. 159-170.

Zhang, Xiaohui; Shaw, John M., "Impact of Multiphase Behavior on Coke Deposition in Heavy Oils Hydroprocessing Catalysts", Energy and Fuels, (2006), pp. 473-480, vol. 20.

Pereira, Carmo J., "Mild Hydrocracking using IsoTherming Technology", 2008 Annual Meeting of the NPRA, San Diego, California.

Shaw, John M.; Gaikwad, Rajendra P.; Stowe, Douglas A., "Phase splitting of pyrene-tetralin mixtures under coal liquefication conditions", Fuel, (1988), pp. 1554-1559, vol. 67.

Audibert, Francois; Duhaut, Pierre, "Residual Reduction by Hydrotreatment", Proceedings from American Petroleum Institute, Division of Refining, (1970), pp. 992-1010, vol. 50.

Niu, C.; Dai, L.; Gao, Y.; Yang, Q.; Nie, H.; Shi, Y.; Li, D., "RICP, A Novel Integrated Process to Get More Light Oil from Residue", The 14th International Congress on Catalysis, (2008), Seoul, South Korea.

Ternan, Marten; Rahimi, Parviz M.; Clugston, Donald M.; Dettman, Heather D., "The +525 Degree Celsius Residue Before and After Hydrocracking with Bimodal Catalysts of Varying Macropore Volume", Energy & Fuels, (1994), pp. 518-530, vol. 8.

Varga, J.; Birthler, R.; Karolyi, J.; Steingaszner, P.; Zalai, A., "The hydrocracking of petroleums and tars with high asphalt content by the Varga method", Khimiya i Tekhnologiya Topliv i Masel, (1960), pp. 11-15, vol. 5, Iss.10.

Scott, D.S.; Radlein, D.; Piskorz, J.; Majerski, P.; Debruijn, TH.J.W., "Upgrading of bitumen in supercritical fluids", Fuel, (2001), pp. 1087-1099, vol. 80.

Werzel, F., "Veba Combi-Cracking Process for Heavy Oil Upgrading-Background and Experience", 14th World Petroleum Congress, (1994), Stavanger, Norway.

* cited by examiner

PRIOR ART

INTEGRATED CRUDE REFINING WITH REDUCED COKE FORMATION

CROSS-REFERENCE TO RELATED APPLICATIONS

This application claims priority to U.S. Provisional Application Ser. No. 61/529,565 filed Aug. 31, 2011, herein incorporated by reference in its entirety.

FIELD OF THE INVENTION

This invention is generally related to refining processes for whole or partial crude oils.

BACKGROUND

Refineries for processing of crude oils (or crude oil fractions) currently face a variety of challenges. For example, crude refining is the most energy intensive industry in the United States. As a result, refineries have implemented energy conservation programs, as well as energy integration and efficiency projects. However, even though these programs have resulted in lower energy consumption, the reality is that most existing refineries were built between the 1950s and 1970s, when energy was cheap and the products could be directly sent to market without the need for further processing.

Refineries also face pressure due to the increasing requirements on the specifications for various products. These product specifications may be driven by either government regulation or by the demands of the marketplace. The standard response from the industry to date has largely consisted of adding carbon rejection and/or hydrogen addition steps downstream of existing processes. This has placed further strain on the hydrogen needs of existing refineries. This also tends to exacerbate the problems of energy usage, as large process energy consumers have been introduced that are needed to meet product quality specifications.

The above problems have also contributed to increasing profitability concerns for refineries. Due in part to the price of crude oil, the expense of complying with additional product specifications, and changes in marketplace demand, it is increasingly important for a refinery to improve or maximize the number of carbon atoms that are incorporated into higher value products. Pending $CO_2$ legislation would further increase refining costs, if enacted. Based on the variety of challenges facing refineries, improved methods of refining crude oils are desirable.

U.S. Pat. No. 3,617,501 describes an integrated process for refining a whole crude. The entire crude (including naphtha) is initially hydrotreated, followed by separation in an atmospheric distillation tower. The naphtha and distillate portions are used for fuels. The heavier portions are either separated using a vacuum distillation tower or are sent to a hydrocracker for extinction recycle.

U.S. Pat. No. 5,851,381 describes methods of refining crude oil. The various methods include flashing a crude oil to initially separate out a naphtha and lighter portion from the remainder of the crude oil. The remaining portion of the crude is then hydrodesulfurized and/or hydrotreated. At some point, the remaining portion is separated by what is described as an atmospheric distillation tower. However, this tower is also described as generating a heavy gas oil fraction with a boiling range of 371° C. to 472° C. Separation of such a heavy gas oil fraction in a conventional atmospheric distillation tower would be expected to result in substantial coke formation. As a result, generating such a fraction is normally indicative of the use of a vacuum distillation technique.

U.S. Published Patent Application US 2010/0025291 describes a process for treatment of heavy oils using light hydrocarbon components as a diluent. Hydrotreatment is performed on a heavy crude by processing the whole crude, including the naphtha and distillate fractions. A portion of the naphtha and/or distillate after hydrotreatment is also recycled to achieve a desired relative amount of lighter hydrocarbons to heavy oil. The catalyst for hydrotreatment is described as a supported NiMo catalyst, but no description is provided regarding the pore sizes of the support. The atmospheric residue portion of the whole crude is desulfurized to a level of about 5000 wppm in one example.

U.S. Published Patent Application US 2010/0025293 describes a process for sequential hydroconversion and hydrodesulfurizaton of whole crude oil. A bimodal catalyst with one mode of pore sizes greater than at least 2000 angstroms is used for the hydroconversion. The reactors for hydroconversion and hydrodesulfurization are described as preferably being ebullating bed reactors.

SUMMARY OF THE PREFERRED EMBODIMENTS OF THE INVENTION

In various aspects, methods are provided for processing a crude oil, including: separating a crude oil feedstock to form at least a naphtha fraction and a heavier crude oil fraction, a first cut point temperature for separating a lighter crude oil fraction comprising the naphtha fraction from the heavier crude oil fraction being a temperature from about 250° F. (121° C.) to about 400° F. (204° C.), the heavier crude oil fraction including a portion having a boiling point greater than 1050° F. (566° C.); hydrotreating the naphtha fraction under effective naphtha hydrotreating conditions to form a hydrotreated naphtha effluent; exposing the heavier crude oil fraction to a hydroconversion catalyst under effective hydroconversion conditions to form a hydroconverted effluent, the effective hydroconversion conditions being effective for conversion of at least about 30% of the portion of the heavier crude oil having a boiling point greater than 1050° F. (566° C.); separating the hydroconverted effluent to form at least a distillate fraction and a bottoms fraction, a second cut point temperature for separating the distillate fraction from the bottoms fraction being a temperature from about 650° F. (343° C.) to about 800° F. (427° C.); and hydrotreating the distillate fraction under effective hydrotreating conditions to form a hydrotreated distillate effluent.

Optionally, a portion of the liquid effluent from hydroconversion can be recycled for use as a solvent for hydroprocessing of the heavier crude oil fraction. Examples of recycled portions include a portion of the distillate fraction from hydroconversion or a portion of the 800° F.+ fraction from hydroconversion. Optionally, the hydroconversion can be performed under conditions where some thermal cracking of the feed also occurs in the presence of the hydroconversion catalyst and hydrogen. Such conditions include a temperature of at least about 360° C. and a hydrogen partial pressure of about 1000 psia (6.9 MPa) or less. Optionally, the hydroconversion catalyst can be a small pore catalyst with a median pore diameter of about 85 Å to about 120 Å.

BRIEF DESCRIPTION OF THE DRAWINGS

The attached Figures represent alternative embodiments of the overall invention, as well as comparative examples. The FIG. 1 shows an example of a refinery configuration that includes a vacuum distillation tower, a fluid catalytic cracking unit, and a coker.

DETAILED DESCRIPTION

Introduction

In various aspects, methods are provided for processing of whole or partial crudes in a refinery setting while reducing or eliminating the use of some conventional energy intensive refinery processes. In other aspects, methods are provided for processing of whole or partial crudes while reducing or eliminating triple or quadruple processing of streams within a refinery. Additionally, production of low value products, such as coke, is reduced or minimized. This allows for production of fuels, or a combination of fuels and lubricants, with reduced costs and therefore improved profitability.

Within a refinery, crude distillation (and in particular vacuum distillation), reforming, catalytic cracking, and coking account for most of the energy used in the refinery. Thus, one solution for reducing the energy usage in a refinery is to reduce or minimize the portion of a crude oil feedstock that is processed using these processes.

Within a refinery, a variety of process schemes are used that involve subjecting a given stream within a refinery to three or more processes, and sometimes four or more processes. For example, one method for producing naphtha in a refinery is to distill a feed to produce a distillate boiling range feed; hydroprocess the feed to remove some contaminants; crack the feed such as by using a fluid catalytic cracker; and then hydroprocess the feed again to produce naphtha. Optionally, the above process flow can also include alkylation to improve the octane rating of the naphtha, resulting in a five step process flow. Such multiple step process flows are costly, making the marginal value of the resulting product lower.

Within a refinery, heavy oil fractions that contain polynuclear aromatic hydrocarbons (PNA) represent a potential sink of substantial quantities of hydrogen. Due to the multiple aromatic rings in PNA hydrocarbons, conversion of these molecules into products suitable for use as a motor fuel requires addition of a large proportion of hydrogen. While some conversion of heavy portions of a feed is desirable, finding an alternative use for at least some PNA hydrocarbons while still forming higher value products is even more economically beneficial.

One conventional alternative for handling difficult molecules such as PNA hydrocarbons is to include such molecules in a feed stream that is sent to a coker. In addition to being energy intensive, a substantial portion of the products generated by a coker correspond to coke. Due to the extremely low market value of coke relative to other petroleum feeds and products, any generation of coke as the output from a refinery process is a loss to overall refining profitability.

Based on these identified difficulties, methods are provided herein for processing crude oil feeds with reduced or minimized energy usage, reduced or minimized numbers of processing steps, improved allocation of hydrogen, and reduced or minimized formation of low value products. First, the novel methods herein avoid the use of vacuum distillation, and in many aspects avoid the use of both atmospheric and vacuum distillation. This provides a benefit in reducing the energy required for processing large quantities of a petroleum feed in a reduced pressure environment.

Next, fluid catalytic cracking and other catalytic cracking processes without a pressurized hydrogen atmosphere are eliminated. Coking processes are also eliminated. In addition to being energy intensive, catalytic cracking processes and coking processes typically generate products which still require further processing to be useful as a product or another refinery stream. As a result, coking and/or catalytic cracking processes are relatively expensive methods for making the resulting products. Additionally, catalytic cracking and coking processes generate substantial amounts of lower value products. Of course, coke is one of the main products formed during coking, and is generally undesirable as coke is a low value refinery product. Coke is also a significant product of fluid catalytic cracking, as typically 4-5 wt % of a feed to a fluid catalytic cracking unit is converted into coke. With regard to catalytic cracking, gasoline is the typical majority product. Traditional refineries were configured to produce more gasoline than diesel fuel. However, for a typical fluid catalytic cracking unit, feedstocks contain 10 wt % to 25 wt % of the feedstock into the fluid catalytic cracking unit will boil at less than 650° F. (343° C.). This portion of the feedstock that boils at less than 650° F. (343° C.) primarily corresponds to diesel feedstock type molecules. More recently, refinery spreads for gasoline production have continued to decrease as worldwide demand for gasoline is reduced while distillate demand, such as diesel, continues to grow. This current practice of cracking potentially higher value diesel feedstock molecules into lower value naphtha and $C_4$-molecules can contribute to reduced profitability.

In some aspects of the invention, one feature that enables the elimination of vacuum distillation, catalytic cracking, and coking processes is the ability to effectively hydroprocess heavier feed fractions. This is accomplished in part by hydroprocessing the lighter distillate portions of a feedstock along with the heavier portions in a single process. It is also accomplished in part by recycling the 800° F.+ (427° C.+) hydroconversion products back to the hydroprocessing reactor. This allows the lighter distillate portions of a feedstock and the 800° F.+ products to act as a diluent for the virgin vacuum resid portion (1050° F.+, 566° C.+), improving the overall performance of the process and improving the lifetime for the hydroprocessing catalyst. Optionally, a portion of the hydroprocessed distillate can be recycled for mixing with the input to the hydroprocessing reaction in order to provide additional diluent.

In still other aspects of the invention, configurations and methods are provided for full conversion crude oil refining that reduce energy consumption by more than 30% versus conventional refining without producing coke. Full conversion refining is defined starting with a feed or crude slate that contains at least 1.5 wt % sulfur and at least 40 wt % of molecules boiling at greater than 650° F. (343° C.) and producing a product slate containing at least 60 wt % of fuels in the form of gasoline and diesel and a regular sulfur fuel oil with a sulfur content of less than about 1 wt %.

Various aspects of the invention are enabled by the discovery that the fraction of crude oil boiling above the distillate fuel range (T90 of 650° F., 343° C.) is advantageously cracked into 800° F.− (427° C.−) boiling range products by coprocessing it with the 400° F.-800° F. (204° C.-427° C.) boiling range components of the refinery crude oil feedstock. In a preferred aspect, the refinery can process crude oil without the use of crude oil atmospheric and vacuum distillation towers, without an FCC unit and associated alkylation unit and unsaturated gas plant, and without a coker. Traditional crude distillation is replaced by much less energy intensive flash towers/vessels. Preferably, the crude oil is flashed to provide a bottoms stream with a T5 between 400° F. (204° C.) and 425° F. (216° C.). Because it is a rough flash, between 10% and 20% of the overhead virgin naphtha stream boils at a temperature of 400° F.+ (204° C.+). Naphtha streams where 10%-20% of the naphtha stream boils at 400° F.+ (204° C.) are known by those skilled in the art to be suitable feeds to naphtha reformers.

The elimination of atmospheric and vacuum distillation of the initial crude oil feedstock is also facilitated by use of an atmospheric distillation or flash of the liquid product from the high severity hydroconversion reactor. Because the stream is hydroprocessed, the distillation or flash tower can be operated at higher T without fouling, and the gas products can be used to strip the heavy liquids at the bottom of distillation tower/flashpot. Combining these techniques enables an effective cutpoint for separating a bottoms fraction from the rest of the feed of about 800° F. (427° C.) vs. the traditional 650° F. (343° C.) cutpoint for an atmospheric distillation tower. This allows the liquids produced in the hydroconversion reactor to be separated into rough boiling cuts of 400° F.− (204° C.−), 400° F.-800° F. (204° C.-427° C.), and 800° F.+ (427° C.+). In configurations for fuels production, the 800° F.+ (427° C.+) bottoms are recycled to the hydroconversion reactor. The naphtha fraction is sent to the reformer, and the 400° F.-800° F. (204° C.-427° C.) fraction is sent to a distillate hydrotreater. The distillate hydrotreater is used to reduce the sulfur content to less than about 10 wppm and to meet all other clean diesel specifications. The rough 400° F.-800° F. (204° C.-427° C.) distillate hydrotreater feedstock includes too great a weight percentage of 650° F.+ (343° C.+) material to meet most clean diesel specifications. However, it has been discovered, surprisingly, that processing the 400° F.-800° F. (204° C.-427° C.) fraction of the preferred embodiment of the invention results in substantial conversion of the 650° F.+ (343° C.+) components of the feed because the nitrogen-containing compounds, sulfur-containing compounds, and aromatic compounds converted in a distillate hydrotreater are highly concentrated in the 650° F.+ (343° C.+) feed components. It is noted that removal of nitrogen-containing and sulfur-containing compounds and hydrogenation of aromatic rings results in substantial boiling point reduction.

In some embodiments of the invention, reference is made to conversion of a feedstock relative to a conversion temperature T. Conversion relative to a temperature T is defined based on the portion of the feedstock that boils at a temperature greater than the conversion temperature T. The amount of conversion during a process (or optionally across multiple processes) is defined as the weight percentage of the feedstock that is converted from boiling at a temperature above the conversion temperature T to boiling at a temperature below the conversion temperature T. For example, consider a feedstock that includes 40 wt % of components that boils at 1050° F. (566° C.) or greater. By definition, the remaining 60 wt % of the feedstock boils at less than 1050° F. (566° C.). For such a feedstock, the amount of conversion relative to a conversion temperature of 1050° F. (566° C.) would be based only on the 40 wt % that initially boils at 1050° F. (566° C.) or greater. If such a feedstock is exposed to a process with 30% conversion relative to a 1050° F. (566° C.) conversion temperature, the resulting product would include 72 wt % of components boiling below 1050° F. (566° C.) and 28 wt % of components boiling above 1050° F. (566° C.).

Example of Traditional Refinery Processing—Prior Art

The following example is provided to illustrate traditional concepts for refining of a crude oil. The following example is not intended to represent any particular refinery currently in existence.

Figure 1:
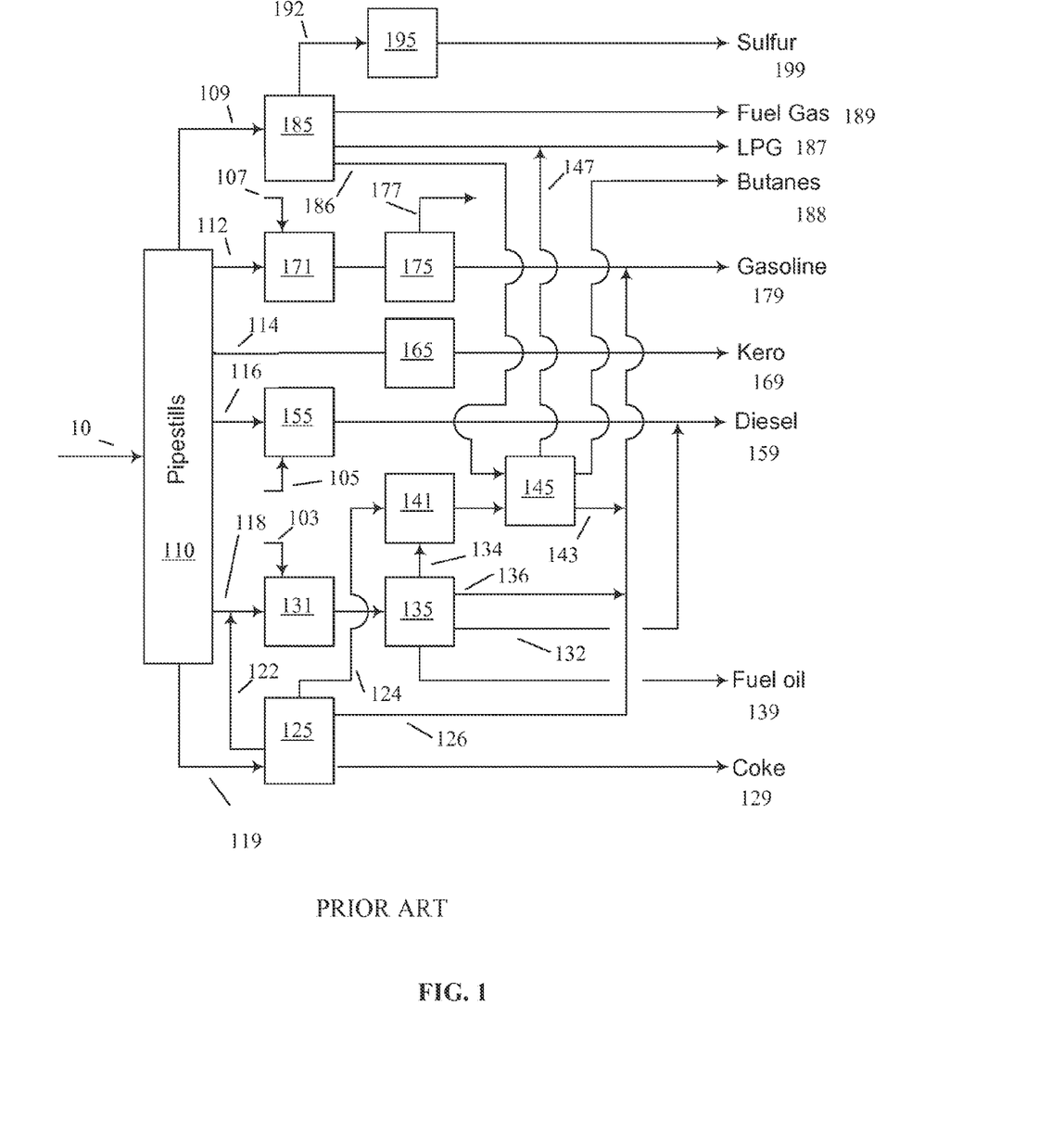

FIG. 1 schematically shows a general schematic of a typical conventional refinery configuration of the prior art including traditional methods for processing of a whole crude oil feed. The configuration shown in FIG. 1 is designed for production of fuels. In FIG. 1, a pipestill 110 is used for fractionation of an incoming crude oil feed 10. The pipestill 110 has the ability to perform both atmospheric and vacuum distillation. The pipestill 110 can generate a variety of output streams, include a light ends stream 109, a naphtha stream 112, optionally a kerosene, jet fuel, or other light distillate streams 114, a diesel or other medium distillate streams 116, and one or more atmospheric and/or vacuum gas oil streams 118. The bottoms 119 can correspond to a vacuum resid stream, although for some feeds the bottoms may still be suitable as a heavy vacuum gas oil.

The various outputs from pipestills 110 are processed independently, although some integration of output streams is performed. In the example shown in FIG. 1, the bottoms 119 are passed into a coker 125. The coker generates a variety of output streams, including a coker gas oil 122, a coker olefin stream 124, a coker naphtha stream 126, and coke 129. The coke 129 represents a final, albeit somewhat undesirable, product from the coker. The coker naphtha 126 can be added to the gasoline output stream or pool 179 along with other naphtha generated by the refinery. The coker olefin stream 124 can be passed into an unsaturated gas plant 141 for further processing. The coker gas oil may conventionally be used in several ways. In FIG. 1, the coker gas oil is passed into hydrotreater 131 for eventual processing in catalytic cracker (such as a fluid catalytic cracker) 135. Alternatively, the coker gas oil may be suitable for inclusion in diesel output stream or pool 159, or the coker gas oil can be used as heating oil.

In FIG. 1, the atmospheric and vacuum gas oils 118 are hydrotreated 131 in the presence of a hydrogen stream 103 to remove contaminants such as metals, sulfur, and nitrogen. The hydrotreated gas oil effluent can then be sent to a catalytic cracker 135, which results in production of a catalytic olefin gas stream 134, coker naphtha 136, a catalytic gas oil 132, and a catalytic bottoms product 139. This catalytic bottoms product 139 is typically sold as a fuel oil product. The catalytic olefin gas stream 134 is passed into the unsaturated gas plant 141. The coker naphtha 136 is added to gasoline pool 179. The catalytic gas oil 132 may be added to diesel pool 159 as shown, or the catalytic gas oil may be sold as heating oil.

The coker olefin stream 124 and catalytic olefin stream 134 are recovered in unsaturated gas plant 141 for use in an alkylation unit 145. A butane stream 186 from saturated gas plant 185 can also be processed in alkylation unit 145. The alkylation unit 145 produces an alkylate stream 143 that is useful as an additive for gasoline pool 179. The alkylation unit 145 also generates a butane output 188 and a liquid petroleum gas output 147 that can be added to a liquid petroleum gas output 187.

The diesel output 116 from the pipestill is hydrotreated 155 in the presence of hydrogen 105 to produce a low sulfur diesel product 159. Other suitable boiling range products may be added to low sulfur diesel product 159 to form the overall diesel pool. Similarly, the kerosene output 114 from the pipestill can be treated to make a suitable kerosene or jet fuel product 169. For example, the kerosene output 114 can be treated with caustic 165 or hydrotreated to reduce the sulfur content.

The naphtha output 112 is hydrotreated 171 in the presence of hydrogen 107 to reduce the sulfur content. The hydrotreated naphtha can then be reformed 175 to improve the octane rating before being added to gasoline pool 179. The reformer 175 also generates an output stream of hydrogen 177.

The light ends output 109 is processed in a saturated gas plant 185. The saturated gas plant generates a butane output 186, a liquid petroleum gas stream 187, and a fuel gas stream 189. The saturated gas plant also separates out a hydrogen sulfide stream 192 that is processed in a Claus plant 195. The Claus plant generates a residual sulfur output 199.

In a refinery having a configuration similar to the configuration shown in FIG. 1, the combined yield of coke and light gases (3 or 4 carbons or less) would be about 15%. By contrast, in a refinery that removes catalytic crackers and cokers, it is believed that the yield of coke and light gases can be reduced to about 4% to 5%.

Processing Overview of Embodiments of the Invention

The remaining sections herein will be dedicated to describing various embodiments of the present invention.

In contrast to the configuration shown in FIG. 1, a crude oil can be processed to form various fuels products without the use of a vacuum distillation tower, a catalytic cracker, or a coker. Briefly, a desalted crude oil is fed to a flash tower or other separator where light ends and naphtha are separated out from a remaining heavier portion. The light ends and naphtha are separated in a gas plant and amine treater, resulting in product streams of straight run naphtha, fuel gas, liquid petroleum gas, and butanes, while sour gas is disposed in a sulfur unit. The straight run naphtha is then hydrotreated and reformed to obtain a high octane gasoline component. The preflash bottoms or heavy portion from the flash tower are then routed to a hydroconversion unit. In this unit, thermal cracking of the crude takes place in a fixed bed reactor in the presence of hydrogen. The process utilizes commercial hydrotreating catalyst. The product is separated into individual fractions in an atmospheric tower, such as an atmospheric flash tower. Preferably, the atmospheric tower can generate three rough fractions corresponding to a 400° F.− (204° C.−) fraction, a 400° F.-800° F. (204° C.-427° C.) fraction and an 800° F.+ (427° C.+) fraction. Preferably, at least a portion of the offgas products from the hydroconversion unit can be used to strip heavy liquids from the atmospheric tower bottoms. The naphtha fraction from the atmospheric tower is combined with the straight run naphtha for reforming. The H$_2$S and C$_4$ product from the atmospheric tower are routed to a conventional Saturated Gas Plant to produce LPG and C$_4$ molecules. The sour gas can be disposed in a convention Claus unit. A distillate fraction from the atmospheric tower can be further hydrodesulfurized in a fixed bed reactor using commercial desulfurization catalyst. The distillate fraction can be sent to storage in the kerosene distillation range (250° F.-450° F.) and diesel distillation range (450° F.-700° F.). Preferably, the hydrodesulfurization, hydrodenitrogenation, and aromatic saturation of the distillate fraction also results in a sufficient shift in the boiling point curve of the distillate fraction that the product can be sold as diesel fuel without further distillation. Optionally, part of the distillate fraction can be recycled back to the hydroconversion unit. The atmospheric fractionation bottoms can be sold as reduced sulfur fuel oil.

As an alternative, if it is desirable to make lubricant base oils, the production of fuel oil can be eliminated. Optionally, the recycle of distillate fraction to the hydroconversion unit may be eliminated. If lubricants are desired, the atmospheric fractionation tower can be operated so that the atmospheric bottoms produced are in the 650° F.+ (343° C.+) range. This bottoms stream is first deasphalted using a solvent such as pentane. The deasphalted oil (DAO) is hydrotreated using a conventional desulfurization catalyst and then processed in a dewaxing unit using a dewaxing catalyst. The effluent from the dewaxing unit is then fractionated into naphtha, diesel, and lubes.

Initial Processing—Desalting and Flash Separation

As an initial step, a crude oil for processing can be desalted. This is a typical pre-processing step for a crude oil to reduce the amount of metals or metal salts within the crude oil. The crude oil can be desalted at any convenient location or time, either prior to reaching the refinery or at the refinery, such as immediately prior to processing.

After desalting, the crude oil can be separated into one or more lighter fractions and a heavier fraction by flashing the crude oil in a flash tower or separator. In a flash separator, lower boiling components such as light ends and naphtha are separated as gases while the remaining portion of the crude exits the flash separator as a liquid effluent. The flash separator can be operated at a pressure of about 25 psig (172 kPag) to about 60 psig (414 kPag), such as about 30 psig (207 kPag) to about 50 psig (345 kPag). The cut point temperature of the flash separator can be about 250° F. (121° C.) or less, or about 300° F. (149° C.) or less, or about 330° F. (166° C.) or less, or about 360° F. (182° C.) or less, or about 400° F. (204° C.) or less. This cut point temperature corresponds to a cut point for separating naphtha and lower boiling fractions from distillate and other heavier or higher boiling fractions.

In the discussion below, reference will be made to the lighter portion (i.e., lower boiling portion) of the crude oil from the flash separator and the heavier portion (i.e., higher boiling portion) of the crude oil from the flash separator. Such references are made for convenience in understanding the nature of the invention. Of course, separators other than a flash separator may also be used in addition to and/or in place of a flash separator to form a lighter crude oil fraction and a heavier crude oil fraction based on boiling point.

Treatment of Naphtha and Light Ends

The light products from the flash tower or separator are passed into a gas plant and amine treater. The gas plant allows for separation of naphtha from a variety of lighter products, including fuel gas, propane, butane, and sour gas (including H$_2$S). For example, a conventional saturated gas plant can be used for separating out the various fractions that are gasses at room temperature. The naphtha fraction is also separated out. The naphtha fraction can be hydroprocessed to meet requirements for use as motor gasoline, such as by reducing the sulfur and/or nitrogen content to suitable levels. For example, the sulfur content of the naphtha can be reduced to 10 wppm or less, preferably 8 wppm or less. After hydrotreatment, the naphtha fraction can be subjected to a reforming process to improve the octane rating.

Suitable catalysts for hydrotreating naphtha include catalysts that are comprised of at least one Group VIII metal oxide (Columns 8-10 of IUPAC periodic table), preferably an oxide of a metal selected from selected from Co and/or Ni, more preferably Co; and at least one Group VI metal oxide (Column 6 of IUPAC periodic table), preferably an oxide of a metal selected from Mo and W, more preferably Mo, on a support material, such as silica or alumina. Other suitable hydrotreating catalysts include zeolitic catalysts, as well as noble metal catalysts where the noble metal is selected from Pd and Pt. It is within the scope of the present invention that more than one type of hydrotreating catalyst be used in the same reaction vessel. The Group VIII metal oxide of a selective hydrodesulfurization catalyst can be present in an amount ranging from about 0.1 to about 20 wt %, preferably from about 1 to about 12%. The Group VI metal oxide can be present in an amount ranging from about 1 to about 50 wt %, preferably from about 2 to about 20 wt %. All metal oxide weight percents are on support. By "on support" we mean that the percents are based on the weight of the support. For example, if the support were to weigh 100 g then 20 wt % Group VIII metal oxide would mean that 20 g of Group VIII metal oxide is on the support.

The hydrodesulfurization catalysts are preferably supported catalysts. Any suitable refractory catalyst support material, preferably inorganic oxide support materials, can be used as supports for the catalyst of the present invention. Non-limiting examples of suitable support materials include: zeolites, alumina, silica, titania, calcium oxide, strontium oxide, barium oxide, carbons, zirconia, magnesia, diatomaceous earth, cerium oxide, lanthanide oxides, chromia, thorium oxide, urania, niobia, tantala, tin oxide, zinc oxide, and aluminum phosphate. Preferred are alumina, silica, and silica-alumina. It is understood that the support material can also contain small amounts of contaminants, such as iron, sulfates, silica, and various metal oxides that can be introduced during the preparation of the support material. These contaminants are present in the raw materials used to prepare the support and will preferably be present in amounts less than about 1 wt %, based on the total weight of the support. It is more preferred that the support material be substantially free of such contaminants. In another embodiment, about 0 to about 5 wt %, preferably from about 0.5 to about 4 wt %, and more preferably from about 1 to about 3 wt % of an additive can be present in the support, which additive is selected from the group consisting of phosphorus and metals or metal oxides from Group IA (alkali metals) of the Periodic Table of the Elements.

Generally, hydrodesulfurization conditions can include temperatures from about 425° F. (218° C.) to about 800° F. (427° C.), preferably from about 500° F. (260° C.) to about 650° F. (343° C.). Other selective hydrodesulfurization conditions can include a pressure of from about 60 psig (414 kPa) to about 800 psig (5516 kPa), preferably from about 100 psig (1379 kPa) to about 500 psig (3447 kPa), more preferably from about 250 psig (1724 kPa) to about 400 psig (2758 kPa). The hydrogen feed rate can be from about 50 standard cubic feet per barrel (scf/b) (8.4 m$^3$/m$^3$) to about 1000 scf/b (169 m$^3$/m$^3$), preferably from about 100 scf/b (17 m$^3$/m$^3$) to about 200 scf/b (34 m$^3$/m$^3$). The liquid hourly space velocity can be from about of about 0.5 hr$^{-1}$ to about 15 hr$^-$, preferably from about 0.5 hr$^{-1}$ to about 10 hr$^{-1}$, more preferably from about 1 hr$^{-1}$ to about 5 hr$^{-1}$.

The hydrodesulfurized naphtha effluent can then be reformed to increase the octane rating of the naphtha. The reforming catalyst and conditions of reforming may be conventional conditions for reforming a naphtha boiling range feed to improve octane rating. The catalyst may be monofunctional or bi-functional (metallic and acidic catalytic sites). Suitable catalysts include, but are not necessarily limited to, catalysts comprising one or more metals, preferably a precious metal selected from the group consisting of Pt, Ir, Re, Ru, Sn and Pd, so as to be a mono- or bi- and/or poly metallic-functional catalysts. Suitable catalysts also include, but are not necessarily limited to, catalysts comprising a support, preferably a support selected from the group consisting of alumina, silica, silica-alumina zeolites, chlorided alumina, fluorided alumina, bromided alumina, or a mixture thereof. In some aspects, the catalyst may be metallic-acidic bifunctional catalyst wherein one type of catalytic site is metallic and another is an acidic non-metallic site. The reforming conditions can include a reactor inlet temperature in the range of from about 450° C. to about 565° C.; a pressure in the range of from about 50 psig (343 kPa) to about 500 psig (3447 kPa), such as from about 50 psig (343 kPa) to about 200 psig (1379 kPa); and a flow rate in the range of from about 0.8 h$^{-1}$ to about 3.0 h$^{-1}$, such as from about 1.0 h$^{-1}$ to about 2.0 h$^{-1}$.

Hydroconversion of Heavy Crude Oil Portion

After removal of the light ends and naphtha, the remaining portion of the crude oil is exposed to a hydroprocessing catalyst under conditions suitable for hydroconversion. The hydroconversion conditions allow for conversion of a portion of the feed that boils above 1050° F. (566° C.) to molecules that boil below 1050° F. (566° C.). Converting these heavier molecules to a lower boiling range increases the potential uses and value of these molecules. In various aspects, the hydroconversion process can be used to convert at least 30 wt % of the 1050° F.+ (566° C.+) portion of the input feed to the hydroconversion unit, such as at least 40 wt %, or at least 50 wt %. It is noted that the unconverted portion of the 1050° F.+ (566° C.+) feed is only modestly desulfurized during the hydroconversion process. In a preferred aspect where fuels production is desired, the feed to the hydroconversion unit is converted to C$_4$-gas, C$_5$-400° F. (204° C.) naphtha, 400° F.-800° F. (204° C.-427° C.) distillate, and 800° F.+ (427° C.+) low sulfur fuel oil having less than about 1 wt % sulfur. In various aspects, the hydroconversion process can be used to convert at least about 30 wt % of the 800° F.+ (427° C.+) portion of the input feed to the hydroconversion unit, such as at least about 40 wt % or at least about 50 wt %.

In some aspects, processing of the entire heavier fraction from the flash separator provides an advantage for conversion of 1050° F.+ (566° C.+) molecules to molecules that boil below 1050° F. (566° C.). The entire heavier fraction will typically include 10 wt % to 30 wt % of distillate or diesel boiling range molecules, such as molecules having a boiling point of at least about 400° F. (204° C.), or at least about 450° F. (232° C.), and about 800° F. (427° C.) or less, or about 750° F. (399° C.) or less. Optionally, kerosene boiling range molecules can also be included as part of the diesel boiling range molecules, such as molecules having a boiling point of at least about 250° F. (121° C.), or at least about 300° F. (149° C.), or at least about 330° F. (166° C.). In such an option, the upper end of the kerosene range can correspond to the lower end of the distillate range. The amount of kerosene included in the distillate or diesel boiling range can be determined based on the separation temperature of the flash separator. Optionally, a portion of the hydroconverted 800° F.+ (427° C.+) effluent can also be recycled.

The distillate boiling range molecules in the crude oil, and optionally the additional recycled distillate boiling range molecules, facilitate the conversion of the heavier molecules in the crude oil, such as by acting as a solvent. Additionally, any recycled portion of the hydroconverted 800° F.+ (427° C.+) can also act as a solvent relative to the unconverted 1050° F.+ (566° C.+) portion of the input feedstock. This solvent effect can be beneficial for hydroconversion of the heavy portion of the crude oil using a conventional large pore catalyst for processing of heavy oils, such as a catalyst with a median pore diameter of 150 Å or greater. Additionally, the solvent effect can also be beneficial for enabling hydroconversion of the heavy portion of the crude oil with a smaller pore catalyst, such as a catalyst with a median pore diameter of about 85 Å to about 120 Å.

In some aspects, the amount of distillate boiling range molecules relative to the amount of heavier boiling molecules is determined by the composition of the initial crude oil and the cut point of the flash separator. For example, if kerosene boiling range molecules are present in the initial feed, some adjustment of the amount of diesel boiling range molecules can be provided by adjusting the cut point temperature of the flash separator used for initial separation of the crude oil feedstock. For example, additional kerosene can be included in the heavy oil feed by selecting a flash cutpoint temperature of less than 400° F. (204° C.), such as a temperature of at least 350° F. (177° C.) or at least 375° F. (190° C.). Alternatively, the amount of distillate could be reduced by selecting a higher flash cutpoint temperature for separation of a naphtha (and lower) boiling range portion of the feed from a distillate (and higher) boiling range portion of the feed.

In some other aspects, the amount of diesel boiling range molecules relative to the amount of heavier boiling molecules can be selected by recycling a distillate boiling range portion of the effluent from the hydroconversion reaction. Optionally, the recycled distillate boiling range portion that is recycled can be hydrotreated prior to recycling. The amount of the recycled distillate fraction can be at least about 5 wt % of the combined weight of the input to the hydroconversion unit (e.g., the combined weight of the recycled distillate fraction and heavier portion from the flash separator), such as at least about 10 wt %. Preferably, the amount of recycled distillate fraction is 25 wt % or less of the combined weight of the input to the hydroconversion unit, such as 20 wt % or less.

Recycling a distillate boiling range portion for use as part of the input feed to the hydroconversion unit can allow for selection of the composition of the input feed. For example, the input feed to the hydroconversion reaction can be comprised of from 30 wt % to 95 wt % of heavy hydrocarbon molecules that boil higher than the diesel boiling range (i.e., higher boiling than 750° F. or 399° C., such as higher boiling than 800° F. or 427° C.) and from 5 wt % to 70 wt % of diesel boiling range molecules based on total weight of the input feed. Alternatively, the input feed to the hydroconversion reaction can comprise from 40 wt % to 80 wt % of the heavy hydrocarbon boiling range component and from 10 wt % to 60 wt % of the diesel boiling range component, based on total weight of the input feed. In aspects where distillate boiling range material is returned to the input feed for the hydroconversion reaction, the recycled diesel boiling range molecules can be combined with the heavier portion of the crude oil from the flash separator within the hydroconversion vessel or hydroconversion zone, or the recycle stream can be added to the input feed prior to the input feed entering the hydroconversion vessel or hydroconversion zone.

The catalysts used for hydroconversion of the heavy portion of the crude oil from the flash separator can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. It is within the scope of the present invention that more than one type of hydroprocessing catalyst can be used in one or multiple reaction vessels.

The at least one Group VIII non-noble metal, in oxide form, can typically be present in an amount ranging from about 2 wt % to about 30 wt %, preferably from about 4 wt % to about 15 wt %. The at least one Group VI metal, in oxide form, can typically be present in an amount ranging from about 2 wt % to about 60 wt %, preferably from about 6 wt % to about 40 wt % or from about 10 wt % to about 30 wt %. These weight percents are based on the total weight of the catalyst.

A vessel or hydroprocessing zone in which catalytic activity occurs can include one or more hydroprocessing catalysts. Such catalysts can be mixed or stacked, with the catalyst preferably being in a fixed bed in the vessel or hydroprocessing zone.

The support can be impregnated with the desired metals to form the hydroprocessing catalyst. In particular impregnation embodiments, the support is heat treated at temperatures in a range of from 400° C. to 1200° C. (752° F. to 2192° F.), or from 450° C. to 1000° C. (842° F. to 1832° F.), or from 600° C. to 900° C. (1112° F. to 1652° F.), prior to impregnation with the metals.

In an alternative embodiment, the hydroprocessing catalyst is comprised of shaped extrudates. The extrudate diameters range from $1/32$nd to $1/8^{th}$ inch, from $1/20^{th}$ to $1/10^{th}$ inch, or from $120^{th}$ to $1/16^{th}$ inch. The extrudates can be cylindrical or shaped. Non-limiting examples of extrudate shapes include trilobes and quadralobes.

The process of this invention can be effectively carried out using a hydroprocessing catalyst having any median pore diameter effective for hydroprocessing the heavy oil component. For example, the median pore diameter can be in the range of from 30 to 1000 Å (Angstroms), or 50 to 500 Å, or 60 to 300 Å. Pore diameter is preferably determined according to ASTM Method D4284-07 Mercury Porosimetry. In a particular aspect, the hydroprocessing catalyst has a median pore diameter in a range of from 50 to 200 Å. Alternatively, the hydroprocessing catalyst has a median pore diameter in a range of from 90 to 180 Å, or 100 to 140 Å, or 110 to 130 Å. In another aspect, the hydroprocessing catalyst has a median pore diameter ranging from 50 Å to 150 Å. Alternatively, the hydroprocessing catalyst has a median pore diameter in a range of from 60 Å to 135 Å, or from 70 Å to 120 Å. The process of this invention is also effective with hydroprocessing catalysts having a larger median pore diameter. For example, the process can be effective using a hydroprocessing catalyst having a median pore diameter in a range of from 180 to 500 Å, or 200 to 300 Å, or 230 to 250 Å.

In still other aspects, the hydroprocessing catalyst has a median pore diameter of at least 85 Å, such as at least 90 Å, and a median pore diameter of 120 Å or less, such as 105 Å or less. This can correspond, for example, to a catalyst with a median pore diameter from 85 Å to 120 Å, such as from 85 Å to 100 Å or from 85 Å to 98 Å.

It is preferred that the hydroprocessing catalyst have a pore size distribution that is not so great as to negatively impact catalyst activity or selectivity. For example, the hydroprocessing catalyst can have a pore size distribution in which at least 60 vol % of the pores have a pore diameter within 45 Å, 35 Å, or 25 Å of the median pore diameter. In certain embodiments, the catalyst has a median pore diameter in a range of from 50 to 180 Å, or from 60 Å to 150 Å, or from 85 Å to 120 Å, with at least 60 vol % of the pores having a pore diameter within 45 Å, 35 Å, or 25 Å of the median pore diameter.

Pore volume should be sufficiently large to further contribute to catalyst activity or selectivity. For example, the hydroprocessing catalyst can have a pore volume of at least 0.3 cm$^3$/g, at least 0.7 cm$^3$/g, or at least 0.9 cm$^3$/g. In certain embodiments, pore volume can range from 0.3-0.99 cm$^3$/g, 0.4-0.8 cm$^3$/g, or 0.5-0.7 cm$^3$/g.

In certain embodiments, the catalyst exists in shaped forms, for example, pellets, cylinders, and/or extrudates. The catalyst typically has a flat plate crush strength in a range of from 50-500 N/cm, or 60-400 N/cm, or 100-350 N/cm, or 200-300 N/cm, or 220-280 N/cm.

Contacting conditions in the contacting or hydroconversion zone can include, but are not limited to, temperature, pressure, hydrogen flow rate, hydrocarbon feed flow rate, or combinations thereof. Contacting conditions in some embodiments are controlled to yield a product with specific properties. For example, one option is to select processing conditions that result in an 800° F.+ (427° C.+) products that contains less than 1 wt % of sulfur and at least 25 wt % of aromatic carbons as measured by $^{13}$C NMR. Reaction temperatures of greater than about 780° F. (416° C.) and reaction pressures of about 1000 psig (6.9 MPag) or less can be used to generate this desired product.

The hydroconversion is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as H$_2$S and NH$_3$ are undesirable and would typically be removed from the treat gas before it is conducted to the reactor. The treat gas stream introduced into a reaction stage will preferably contain at least about 50 vol % and more preferably at least about 75 vol % hydrogen.

Hydrogen can be supplied at a rate of from about 100 SCF/B (standard cubic feet of hydrogen per barrel of feed) (17 Nm$^3$/m$^3$) to about 10,000 SCF/B (1685 Nm$^3$/m$^3$). Preferably, the hydrogen is provided in a range of from about 200 SCF/B (34 Nm$^3$/m$^3$) to about 3000 SCF/B (505 Nm$^3$/m$^3$). Hydrogen can be supplied co-currently with the input feed to the hydroconversion reactor and/or reaction zone or separately via a separate gas conduit to the hydroprocessing zone.

Temperature in the contacting zone can range from 550° F. (288° C.) to 1000° F. (538° C.), or from 600° F. (316° C.) to 950° F. (510° C.), or from 650° F. (343° C.) to 900° F. (482° C.). In some embodiments, temperature in the contacting zone can range from 650° F. (343° C.) to 950° F. (510° C.). Total pressure in the contacting zone can range from 500 psig (3447 kPa-g) to 2000 psig (13790 kPa-g), preferably from 700 psig (4826 kPa-g) to 1200 psig (8273 kPa-g). Liquid hourly space velocity (LHSV) of the input feed will generally range from 0.1 to 10 h$^{-1}$, or 0.5 h$^{-1}$ to 5 h$^{-1}$.

In other aspects, the hydroprocessing conditions correspond to hydroprocessing conditions that also result in at least some thermal cracking of a feed in the presence of a catalyst and hydrogen. The temperature in the contacting zone can be at least about 680° F. (360° C.), such as at least about 700° F. (371° C.), and preferably at least about 716° F. (380° C.), such as at least about 750° F. (399° C.) or at least about 788° F. (420° C.). Additionally or alternately, the temperature in the contacting zone can be about 950° F. (510° C.) or less, such as about 900° F. (482° C.) or less, and preferably about 869° F. (465° C.) or less or about 842° F. (450° C.) or less.

Under hydroprocessing conditions that also result in at least some thermal cracking of a feed, total pressure in the contacting zone can range from 400 psig (2758 kPa-g) to 3000 psig (20684 kPa-g), such as from 650 psig (4482 kPa-g) to 2000 psig (13790 kPa-g), or from 800 psig (5516 kPa-g) to 1500 psig (10342 kPa-g). Preferably, a heavy oil can be hydroprocessed under low hydrogen partial pressure conditions. In such aspects, the hydrogen partial pressure during hydroprocessing can be from about 400 psig (2758 kPa-g) to about 1000 psig (6895 kPa-g), such as from 500 psig (3447 kPa-g) to about 800 psig (5516 kPa-g). Additionally or alternately, the hydrogen partial pressure can be at least about 400 psig (2758 kPa-g), or at least about 500 psig (3447 kPa-g), or at least about 600 psig (4137 kPa-g). Additionally or alternately, the hydrogen partial pressure can be about 1000 psig (6895 kPa-g) or less, such as about 900 psig (6205 kPa-g) or less, or about 850 psig (5861 kPa-g) or less, or about 800 psig (5516 kPa-g) or less, or about 750 psig (5171 kPa-g) or less. In such aspects with low hydrogen partial pressure, the total pressure in the reactor can be about 1200 psig (8274 kPa-g) or less, and preferably 1000 psig (6895 kPa-g) or less, such as about 900 psig (6205 kPa-g) or less or about 800 psig (5516 kPa-g) or less.

Under hydroprocessing conditions that also result in at least some thermal cracking of a feed, the liquid hourly space velocity (LHSV) of the combined heavy hydrocarbon oil and any recycle components will generally range from 0.1 to 30 h$^{-1}$, or 0.4 h$^{-1}$ to 20 h$^{-1}$, or 0.5 to 10 h$^{-1}$. In some aspects, LHSV is at least 15 h$^{-1}$, or at least h$^{-1}$, or at least 5 h$^{-1}$. Alternatively, in some aspects LHSV is about 2.0 h$^{-1}$ or less, or about 1.5 h$^{-1}$ or less, or about 1.0 h$^{-1}$ or less. The hydrogen treat gas rate can be any of the hydrogen treat gas rates described above.

In an embodiment, contacting the input feed to the hydroconversion reactor with the hydroprocessing catalyst in the presence of hydrogen to produce a hydroprocessed product is carried out in a single contacting zone. In another aspect, contacting is carried out in two or more contacting zones.

Relative to the heavy portion of the crude oil from the flash separator, the hydroconverted product or effluent will be a material or crude product that exhibits reductions in such properties as average molecular weight, boiling point range, density and/or concentration of sulfur, nitrogen, oxygen, and metals. For example, in some aspects, the hydroconverted product has a total Ni/V/Fe content of at most 50%, or at most 10%, or at most 5%, or at most 3%, or at most 1% of the total Ni/V/Fe content of the heavy portion of the crude oil from the flash separator. In certain aspects, the fraction of the hydroconverted product that has a boiling point of 650° F. (343° C.) and higher (i.e., 650° F.+ (343° C.+) product fraction) has, per gram of 650° F.+ (343° C.+) product fraction, a total Ni/V/Fe content in a range of from $1 \times 10^{-7}$ grams to $2 \times 10^{-4}$ grams (0.1 to 200 ppm), or $3 \times 10^{-7}$ grams to $1 \times 10^{-4}$ grams (0.3 to 100 ppm), or $1 \times 10^{-6}$ grams to $1 \times 10^{-4}$ grams (1 to 100 ppm). In certain aspects, the 650° F.+ (343° C.+) product fraction has not greater than $4 \times 10^{-5}$ grams of Ni/V/Fe (40 ppm).

In certain aspects, the hydroconverted product has an API gravity that is 100-160%, or 110-140% of that of the heavy portion of the crude oil from the flash separator. Additionally or alternately, in some aspects the amount of hydrogen used to saturate aromatic rings in the 800° F.+ (427° C.+) product is reduced or minimized. In some preferred aspects, the aromatic content of the 800° F.+ portion of the product from hydroconversion is lower than the aromatic content of the 800° F.+ portion of the feed prior to conversion by about 5 wt % or less, such as by about 3 wt % or less.

In certain aspects, the 400° F.+ (204° C.+) portion of the hydroconverted product has a viscosity of at most 90%, or at most 80%, or at most 70% of that of the heavy portion of the crude oil from the flash separator. In some aspects, the viscosity of the hydroconverted product is at most 90% of the viscosity of the heavy portion from the flash separator, while the API gravity of the hydroconverted product is 100-160%, or 105-155%, or 110-150% of that of the heavy portion from the flash separator. In an alternative aspect, the 650° F.+ (343° C.+) product fraction can have a viscosity at 100° C. of 10 to 150 cst, or 15 to 120 cst, or 20-100 cst. Most atmospheric resids of crude oils range from 40 to 200 cst. In certain aspects, 650° F.+ (343° C.+) product fraction has a viscosity of at most 90%, or at most 50%, or at most 5% of that of the heavy portion from the flash separator.

In some aspects, the hydroconverted product has a total heteroatom (i.e., S/N/O) content of at most 50%, or at most 25%, or at most 10% of the total heteroatom content of the heavy hydrocarbon oil component. In some aspects, the sulfur content of the hydroconverted product is at most 50%, or at most 25%, or at most 10% of the sulfur content of the heavy portion of the crude oil from the flash separator. The total nitrogen content of the hydroconverted product is at most 80%, or at most 60%, or at most 40% of that of the heavy portion from the flash separator.

Separation of Hydroconverted Effluent

After hydroconversion, the hydroconverted effluent is separated such as by atmospheric distillation. This results in a variety of hydroconverted product streams. A light ends stream is processed in a manner similar to the light ends portion from the initial flash separator. Similarly, a naphtha boiling range fraction is added to the straight run naphtha for desulfurization and reforming. A distillate product (kerosene plus diesel boiling range molecules) is also generated. If the goal of the process is to make fuels, the bottoms from the atmospheric distillation can be used as a reduced sulfur fuel oil. If the goal of the process is to also make some lubricants, the bottoms can undergo some further processing.

The cut point temperature for separating the naphtha boiling range fraction from the distillate fraction can be about 250° F. (121° C.) or less, or about 300° F. (149° C.) or less, or about 330° F. (166° C.) or less, or about 360° F. (182° C.) or less, or about 400° F. (204° C.) or less. This cut point temperature can be the same as the cut point temperature used for the initial flash separator, or a different cut point temperature can be used for the upper boiling point for naphtha/lower boiling point for distillate formed from the hydroconverted effluent. The cut point temperature for separating the distillate boiling range fraction from the bottoms fraction can be dependent on the type of processing desired for the bottoms fraction. If the bottoms fraction will be used as fuel oil, the cut point temperature for separating the distillate fraction and the bottoms fraction can be from about 650° F. (343° C.) to about 800° F. (427° C.), such as at least 700° F. (371° C.) and/or less than about 750° F. (399° C. If the bottoms fraction will be used for forming lubricant base oils, the cut point temperature can be selected to increase the amount of material available for lubricant production. In this type of configuration, the cut point temperature for separating the distillate fraction from the bottoms fraction can be from about 625° F. (329° C.) to about 700° F. (371° C.), such as about 675° F. or less (357° C.) or about 650° F. or less (343° C.).

In the above description of the products from the atmospheric tower, reference was made to a naphtha product and a distillate product. This was for convenience in describing the nature of the invention. If desired, a plurality of separate naphtha products and/or a plurality of separate distillate products could be formed. Similarly, one or more additional heavy distillate products could be added to the bottoms of the atmospheric distillation tower if desired.

Desulfurization of Distillate (Kerosene and Diesel) Product from Hydroconversion After separation, such as by atmospheric flashing or distillation, the distillate fraction corresponding to the kerosene and diesel boiling range fractions can be hydrotreated or otherwise desulfurized to form low sulfur fuel products. Optionally, a portion of the distillate fraction can be recycled for inclusion as part of the input feed to the hydroconversion unit.

The catalysts used for hydrotreatment of the heavy portion of the crude oil from the flash separator can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. It is within the scope of the present invention that more than one type of hydroprocessing catalyst can be used in one or multiple reaction vessels.

The at least one Group VIII non-noble metal, in oxide form, can typically be present in an amount ranging from about 2 wt % to about 30 wt %, preferably from about 4 wt % to about 15 wt %. The at least one Group VI metal, in oxide form, can typically be present in an amount ranging from about 2 wt % to about 60 wt %, preferably from about 6 wt % to about 40 wt % or from about 10 wt % to about 30 wt %. These weight percents are based on the total weight of the catalyst. Any convenient size, shape, and/or pore size distribution for a catalyst suitable for hydrotreatment of a diesel or distillate boiling range feed in a conventional manner may be used.

A vessel or hydrotreatment zone in which catalytic activity occurs can include one or more hydroprocessing catalysts. Such catalysts can be mixed or stacked, with the catalyst preferably being in a fixed bed in the vessel or hydroprocessing zone.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage will preferably contain at least about 50 vol % and more preferably at least about 75 vol % hydrogen.

Hydrogen can be supplied at a rate of from about 100 SCF/B (standard cubic feet of hydrogen per barrel of feed) (17 Nm$^3$/m$^3$) to about 7500 SCF/B (1265 Nm$^3$/m$^3$). Preferably, the hydrogen is provided in a range of from about 400 SCF/B (68 Nm$^3$/m$^3$) to about 4800 SCF/B (808 Nm$^3$/m$^3$). Hydrogen can be supplied co-currently with the input feed to the hydrotreatment reactor and/or reaction zone or separately via a separate gas conduit to the hydrotreatment zone.

Temperature for the hydrotreatment of the distillate fraction can range from 400° F. (204° C.) to 800° F. (427° C.), or from 500° F. (260° C.) to 750° F. (399° C.). Total pressure for the hydrotreatment of the distillate fraction can range from 300 psig (2068 kPa-g) to 2000 psig (13790 kPa-g), preferably from 400 psig (2758 kPa-g) to 1500 psig (10342 kPa-g). Liquid hourly space velocity (LHSV) of the input feed will generally range from 0.1 to 10 h$^{-1}$, or 0.5 h$^{-1}$ to 2 h$^{-1}$.

Lubricant Production—Deasphalting of Atmospheric Tower Bottoms

In aspects where a lubricant product is desired, at least a portion of the bottoms from the atmospheric tower are not used as fuel oil. Instead, at least a portion of the atmospheric bottoms are deasphalted. This results in a deasphalted bottoms fraction and an asphalt or asphaltene fraction.

Solvent deasphalting is a solvent extraction process. Preferred solvents include alkanes or other hydrocarbons containing about 3 to about 6 carbons per molecule. Examples of suitable solvents include propane, n-butane, isobutene, and n-pentane. Alternatively, other types of solvents may also be suitable, such as supercritical fluids. During solvent deasphalting, a feed portion is mixed with the solvent. Portions of the feed that are soluble in the solvent are then extracted, leaving behind a residue with little or no solubility in the solvent. Preferred solvent deasphalting conditions include mixing a feedstock fraction with a solvent in a weight ratio of from about 1:2 to about 1:10, such as about 1:8 or less. Preferred solvent deasphalting temperatures range from about 100° F. (38° C.) to about 400° F. (204° C.). The pressure during solvent deasphalting can be from about 50 psig (345 kPag) to about 500 psig (3447 kPag).

The portion of the feedstock that is extracted with the solvent is often referred to as deasphalted oil. In various aspects, the bottoms from the atmospheric distillation is used as the feed to the solvent deasphalter, so the portion extracted with the solvent can also be referred to as deasphalted bottoms. The yield of deasphalted oil from a solvent extraction process varies depending on a variety of factors, including the nature of the feedstock, the type of solvent, and the solvent extraction conditions. A lighter molecular weight solvent such as propane will result in a lower yield of deasphalted oil as compared to n-pentane, as fewer components of the heavy oil will be soluble in the shorter chain alkane. However, the deasphalted oil resulting from propane deasphalting is typically of higher quality, resulting in expanded options for use of the deasphalted oil. Under preferred deasphalting conditions, increasing the temperature will also usually reduce the yield while increasing the quality of the resulting deasphalted oil. In various embodiments of the processes herein, the yield of deasphalted oil from solvent deasphalting can be about 85 wt % or less of the feed to the deasphalting process, or about 75 wt % or less. Preferably, the solvent deasphalting conditions are selected so that the yield of deasphalted oil is at least about 25 wt %, such as at least about 45 wt % or at least about 65 wt %.

After the deasphalting process, the yield of deasphalting residue is preferably at least about 15 wt % of the feed to the deasphalting process and can be as much as about 75 wt % or less, but is preferably about 35 wt % or less. The deasphalting residue can be used, for example, for making various grades of asphalt.

Lubricant Production—Hydroprocessing of Deasphalted Bottoms Fraction

After deasphalting, the deasphalted bottoms are hydroprocessed to further remove heteroatoms and to improve the cold flow properties of the deasphalted bottoms. In a first reactor or stage, the deasphalted bottoms can be desulfurized to reduce the sulfur content to a desirable amount. The desulfurized effluent is then dewaxed under catalytic dewaxing conditions.

The processing conditions for desulfurization of the deasphalted bottoms can be similar to the ranges of conditions and catalysts described as potential ranges and catalysts for the distillate desulfurization. Although the same types of conditions and catalysts are suitable for both distillate desulfurization and the deasphalted bottoms desulfurization, in a given aspect there is no requirement of a particular relationship between the conditions for distillate desulfurization and deasphalted bottoms desulfurization.

The hydrodesulfurized effluent is then dewaxed in the presence of a dewaxing catalyst. Suitable dewaxing catalysts can include molecular sieves such as crystalline aluminosilicates (zeolites). In an aspect, the molecular sieve can comprise, consist essentially of, or be ZSM-5, ZSM-22, ZSM-23, ZSM-35, ZSM-48, zeolite Beta, a combination thereof, for example ZSM-23 and/or ZSM-48, or ZSM-48 and/or zeolite Beta. Optionally but preferably, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

One characteristic that can impact the activity of the molecular sieve is the ratio of silica to alumina (Si/Al$_2$ ratio) in the molecular sieve. In an embodiment, the molecular sieve can have a silica to alumina ratio of about 200:1 or less, for example about 150:1 or less, about 120:1 or less, about 100:1 or less, about 90:1 or less, or about 75:1 or less. Additionally or alternately, the molecular sieve can have a silica to alumina ratio of at least about 30:1, for example at least about 40:1, at least about 50:1, or at least about 65:1.

Aside from the molecular sieve(s) and optional binder, the dewaxing catalyst can also optionally but preferably include at least one metal hydrogenation component, such as a Group VIII metal. Suitable Group VIII metals can include, but are not limited to, Pt, Pd, Ni, or a combination thereof. When a metal hydrogenation component is present, the dewaxing catalyst can include at least about 0.1 wt % of the Group VIII metal, for example at least about 0.3 wt %, at least about 0.5 wt %, at least about 1.0 wt %, at least about 2.5 wt %, or at least about 5.0 wt %. Additionally or alternately, the dewaxing catalyst can include about 10 wt % or less of the Group VIII metal, for example about 5.0 wt % or less, about 2.5 wt % or less, about 1.5 wt % or less, or about 1.0 wt % or less.

In some embodiments, the dewaxing catalyst can include an additional Group VIB metal hydrogenation component, such as W and/or Mo. In such embodiments, when a Group VIB metal is present, the dewaxing catalyst can include at least about 0.5 wt % of the Group VIB metal, for example at least about 1.0 wt %, at least about 2.5 wt %, or at least about 5.0 wt %. Additionally or alternately in such embodiments, the dewaxing catalyst can include about 20 wt % or less of the Group VIB metal, for example about 15 wt % or less, about 10 wt % or less, about 5.0 wt % or less, about 2.5 wt % or less, or about 1.0 wt % or less. In one preferred embodiment, the dewaxing catalyst can include Pt and/or Pd as the hydrogenation metal component. In another preferred embodiment, the dewaxing catalyst can include as the hydrogenation metal components Ni and W, Ni and Mo, or Ni and a combination of W and Mo.

Catalytic dewaxing can be performed by exposing a feedstock to a dewaxing catalyst under effective (catalytic) dewaxing conditions. Effective dewaxing conditions can include can be carried out at temperatures of about 550° F. (288° C.) to about 840° F. (449° C.), hydrogen partial pressures of from about 300 psig to about 2000 psig (2.1 MPag to 13.8 MPag), and hydrogen treat gas rates of from 17 $m^3/m^3$ to 169 $m^3/m^3$ (100 SCF/B to 1000 SCF/B). In other embodiments, the conditions can include temperatures in the range of about 650° F. (343° C.) to about 800° F. (427° C.), hydrogen partial pressures of from about 500 psig to about 1500 psig (3.4 MPag-10.3 MPag), and hydrogen treat gas rates of from about 17 $m^3/m^3$ to about 51 $m^3/m^3$ (100 SCF/B to 300 SCF/B). The liquid hourly space velocity (LHSV) of the feed exposed to the dewaxing catalyst can also be characterized. The LHSV of the feed relative to only the dewaxing catalyst can be at least about 0.5 $hr^{-1}$, or at least about 1 $hr^{-1}$. Additionally or alternately, the LHSV of the hydrocracker feed relative to only the dewaxing catalyst can be about 10 $hr^{-1}$ or less, or about 5 $hr^{-1}$ or less.

Feedstocks

In various aspects, the feedstock for processing corresponds to a crude oil, such as a heavy crude oil, or a blend of one or more crude oils. The crude oil can be derived from any convenient source, including non-conventional sources such as crude oils derived from oil sands, tar sands, or coal. Partial crude oils, where some fraction of the crude oil has already been separated out, can also be used. Optionally, the crude oil and/or one or more intermediate streams formed from the crude oil can be blended with another feed that has already been partially processed at another location.

In some aspects of the invention, at least about 20 wt % of the crude oil feedstock can have a boiling point greater than 1050° F., such as at least about 25 wt %, or at least about 30 wt %.

Another option for describing a crude oil feedstock is to describe the boiling point for various portions of the feedstock. For example, a T10 value for a feedstock corresponds to a temperature at which 10 wt % of the feedstock will boil. Thus, a feedstock with 25 wt % of molecules that have a boiling point of 1050° F. (566° C.) or greater would have a T75 value of 1050° F. (566° C.).

Some crude oils can be relatively high in total acid number (TAN). In one aspect, a crude oil used as a feedstock can have a TAN of at least 0.025, such as at least 0.1, or at least 0.5.

Some crude oils can also have a high metals content, such as a high content of nickel, vanadium, and/or iron. In some aspects, a crude oil used as a feedstock can contain at least 0.00001 grams of Ni/V/Fe (10 ppm), such as at least 0.00005 grams of Ni/V/Fe (50 ppm) or at least 0.0001 grams of Ni/V/Fe (100 ppm) per gram of crude oil, on a total elemental basis of nickel, vanadium and iron.

Contaminants such as nitrogen and sulfur are found in crude oils, often in organically-bound form. Nitrogen content can range from about 50 wppm to about 5000 wppm elemental nitrogen, or about 75 wppm to about 800 wppm elemental nitrogen, or about 100 wppm to about 700 wppm, based on total weight of the heavy hydrocarbon component. The nitrogen containing compounds can be present as basic or non-basic nitrogen species. Examples of basic nitrogen species include quinolines and substituted quinolines. Examples of non-basic nitrogen species include carbazoles and substituted carbazoles.

The sulfur content of a crude oil can range from about 500 wppm to about 100,000 wppm elemental sulfur, or from about 1000 wppm to about 50,000 wppm, or from about 1000 wppm to about 30,000 wppm, based on total weight of the crude oil. Sulfur will usually be present as organically bound sulfur. Examples of such sulfur compounds include the class of heterocyclic sulfur compounds such as thiophenes, tetrahydrothiophenes, benzothiophenes and their higher homologs and analogs Other organically bound sulfur compounds include aliphatic, naphthenic, and aromatic mercaptans, sulfides, di- and polysulfides.

Crude oils can also contain n-pentane asphaltenes. In an aspect, the crude oil can contain at least about 3 wt % n-pentane asphaltenes, such as at least about 5 wt % or at least about 10 wt % n-pentane asphaltenes.

Products

Processing a crude oil according to one of the various aspects described herein results in production of a variety of products. A typical product slate from a crude oil will include at least a light ends output (molecules with 4 carbon atoms or less), one or more naphtha products, one or more distillate (kerosene and diesel) products, and $H_2S$. If fuels production is desired, the product slate can also include reduced sulfur fuel oil. If lubricants production is desired, the product slate can also include a lubricant base oil product and an asphalt product.

The percentage of sulfur generated will depend on the amount of sulfur in the original feed. For example, for a feed containing 2.8 wt % of sulfur, a portion of the sulfur may remain in an asphalt or fuel oil product, such as about or 0.3 wt % of the original sulfur in the feed. The remaining 2.5 wt % of sulfur will represent a product generated during processing.

Typically the amount of light ends generated will be 5 wt % or less of the feed. The relatively low amount of light ends generated is due to elimination of catalytic cracking and coking processes that tend to generate additional light ends. The sulfur content of the light ends can be about 20 wppm or less, such as about 10 wppm or less. The nitrogen content can also be less than about 10 wppm, and the metals content can be a trace amount, such as 1 wppm or less.

The amount of naphtha generated during processing will depend on the nature of the feed, including the amount of naphtha boiling range molecules already present in the feed. The amount of reformed naphtha generated by processing can be about the weight percentage of naphtha in the feed plus an addition 10 wt % to 25 wt % of naphtha generated during processing. Additionally, if a lubricant product is co-produced, the catalytic dewaxing process can generate an additional 1 wt % to 3 wt % of naphtha. The sulfur content of the reformed naphtha and/or the additional naphtha from lubricant production can be about 10 wppm or less, such as about 5 wppm or less. The nitrogen content can also be less than about 10 wppm, and the metals content can be a trace amount, such as 1 wppm or less.

The amount of kerosene and distillate generated can depend on the nature of the feed and whether fuels or lubricants production is desired. If lubricant production is desired, the atmospheric separation performed after hydroconversion can have a lower temperature cut point for forming the atmospheric bottoms, resulting in inclusion of additional distillate boiling range material in the atmospheric bottoms. By contrast, when fuels production is desired, the cut point for the atmospheric bottoms can be increased since the atmospheric bottoms is likely to be used as lower value fuel oil. The amount of distillate (kerosene and diesel) product formed during processing can be from about 30 wt % to 60 wt %, depending on the nature of the crude oil and whether fuels or lubricant processing is performed. The sulfur content of the distillate product (kerosene and diesel) can be about 15 wppm or less, such as about 10 wppm or less, preferably 8 wppm or less. The nitrogen content can also be less than about 10 wppm, and the metals content can be a trace amount, such as 1 wppm or less.

If fuels production is performed, about 10 wt % to 20 wt % of the feed can result in production of fuel oil. The sulfur content of the fuel oil can depend on the nature of the feed. A substantial portion of the sulfur content in the fuel oil can correspond to molecules that were not converted during the hydroconversion process. As a result, the sulfur content of the fuel oil may be 85% or less of the sulfur content of the desalted crude oil feedstock, such as about 75% or less. Because the sulfur corresponds to unconverted molecules in the crude oil feedstock, the sulfur content of the fuel oil can be at least about 25% of the sulfur content of the crude oil feedstock, such as at least about 40%, or at least about 50%. The nitrogen content of the fuel oil fraction can be reduced relative to the crude oil feed, such as a nitrogen content of 100 wppm or less or 50 wppm or less. With regard to metals content, typically a crude oil will be desalted and/or demetallated prior to entering the flash separator. Any metals remaining in the crude oil feedstock will typically be concentrated in the heavier portions of the crude oil. These metals may remain in the fuel oil fraction after processing, with little or no metal removal occurring in the processes after the flash separator. As a result, the concentration of metals in the fuel oil product may be proportional to the amount of metals present in the crude oil feed. For example, if the fuel oil product corresponds to 20 wt % of the crude oil feed, the metals concentration in the fuel oil product may be roughly 5 times greater than the metals concentration in the feed.

If lubricants production is performed, about 5 wt % to 20 wt % of the feed can result in production of lubricant base oils, while another 5 wt % to about 15 wt % of the feed can result in production of asphalt. The sulfur content of the lubricant base oil can be about 15 wppm or less, such as about 10 wppm or less, preferably 8 wppm or less. The nitrogen content can also be less than about 10 wppm, and the metals content can be a trace amount, such as 1 wppm or less.

The sulfur content of the asphalt can be similar to the sulfur content of fuel oil as described above. Thus, the sulfur content of the asphalt may be 85% or less of the sulfur content of the desalted crude oil feedstock, such as about 75% or less. Because the sulfur corresponds to unconverted molecules in the crude oil feedstock, the sulfur content of the asphalt can be at least about 25% of the sulfur content of the crude oil feedstock, such as at least about 40%, or at least about 50%. The nitrogen content of the asphalt fraction can be reduced relative to the crude oil feed, such as a nitrogen content of 100 wppm or less or 50 wppm or less. With regard to metals content, typically a crude oil will be desalted and/or demetallated prior to entering the flash separator. Any metals remaining in the crude oil feedstock will typically be concentrated in the heavier portions of the crude oil. These metals may remain in the asphalt fraction after processing, with little or no metal removal occurring in the processes after the flash separator. As a result, the concentration of metals in the asphalt product may be proportional to the amount of metals present in the crude oil feed. For example, if the asphalt product corresponds to 10 wt % of the crude oil feed, the metals concentration in the fuel oil product may be roughly 10 times greater than the metals concentration in the feed.

Example of Refinery Configuration—a Fuels Processing Embodiment

Figure 2:
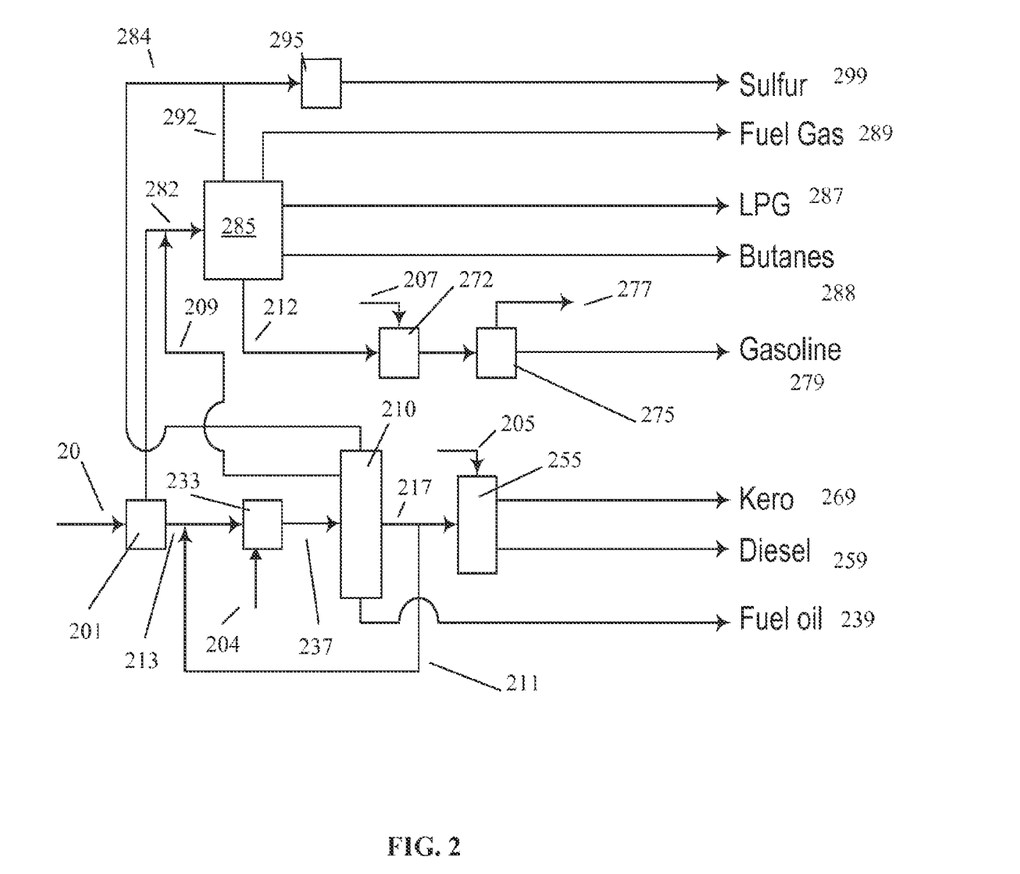
FIG. 2 shows an example of a refinery configuration according to an aspect of the invention for fuels production.

FIG. 2 shows an example embodiment of a refinery configuration according to the invention suitable for forming fuels from a crude oil feedstock. In FIG. 2, a crude oil feed 20 is passed into a flash separator 201 or another type of separator for forming a lighter crude oil portion 282 and a heavier crude oil portion 213. Typically the crude oil feed 20 will be desalted and/or demetallated prior to entering the flash separator 201. The lighter crude oil portion 282 from the flash separator is passed into a separator 285, such as a saturated gas plant and amine treater. Optionally, the lighter crude oil portion can be combined with other refinery streams, such as a light ends stream 209 from hydroconversion unit 210 prior to entering separator 285. Separator 285 produces a sour gas stream 292, a fuel gas stream 289, a stream suitable for use as a liquefied petroleum gas 287, a butane stream 288, and a bottoms portion 212 that corresponds to a naphtha boiling range stream. The sour gas stream 292 can be processed in a Claus plant 295 to form sulfur 299, along with other streams containing $H_2S$, such as sour gas stream 284 from atmospheric tower 210.

The naphtha boiling range stream 212 can be hydrotreated 272 in the presence of hydrogen 207 to form a low sulfur naphtha stream. The low sulfur naphtha stream is then reformed 275 to improve the octane rating for the eventual naphtha output 279, which is suitable for addition to the gasoline pool. Reformer 275 also generates an output stream of hydrogen 277, which can optionally be used as part of the hydrogen input for other processes shown in the configuration.

The heavier portion of the crude oil 213 can optionally (but preferably) be combined with a recycle stream 211 of distillate boiling range material. Alternatively, the recycle stream 211 can be drawn from the total liquid effluent portion of effluent 237 produced by hydroconversion reaction 233. Still another option is to recycle both a portion of the total liquid effluent and a portion of the distillate boiling range material. Yet another option is to not incorporate recycled material. The heavier portion of the crude oil 213 is hydroconverted 233 in the presence of hydrogen 204. The resulting hydroconverted effluent 237 is then fractionated, such as by using an atmospheric distillation tower 210. This results in a sour gas stream 284, a light ends and naphtha stream 209, a distillate boiling range (kerosene and diesel) stream 217, and a fuel oil stream 239. A portion of distillate boiling range stream 217 can be used to form recycle stream 211. The distillate boiling range stream 217 can then be hydrotreated 255 in the presence of hydrogen 205 to form low sulfur distillate products, such as kerosene boiling range product 269 and diesel boiling range product 259.

Example of Refinery Configuration—a Lubes Processing Embodiment

Figure 3:
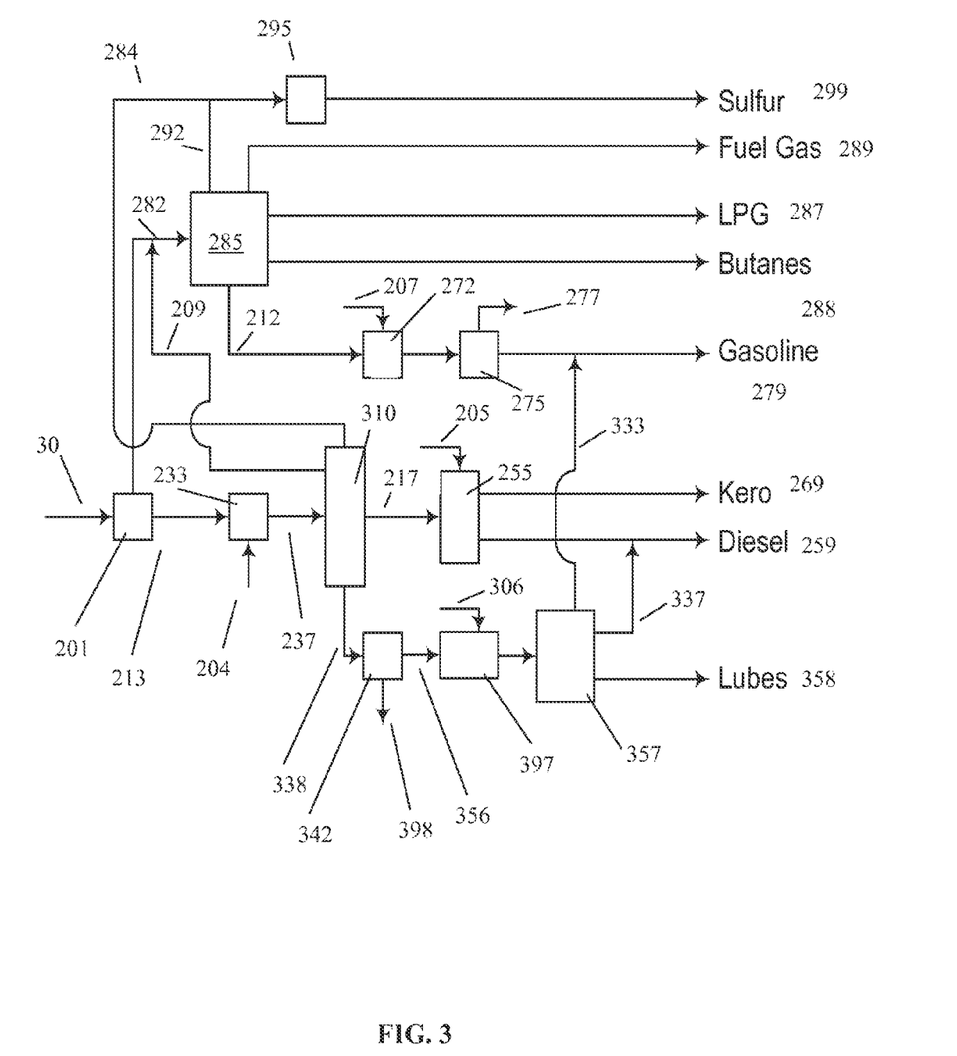
FIG. 3 shows an example of a refinery configuration according to an aspect of the invention for fuels and lubricant base oils production.

FIG. 3 shows an example embodiment of another type of refinery configuration according to the invention for processing a crude oil feedstock 30 to form fuels and lubricant base oils. Elements with the same number between FIGS. 2 and 3 represent elements that are common to both configurations. In FIG. 3, the atmospheric distillation tower 310 may be operated differently than the corresponding atmospheric distillation tower 210 in FIG. 2. In order to increase the amount of lubricant base oil production, it may be desirable for bottoms fraction 338 to correspond to a 650° F.+ (343° C.+) fraction. By contrast, in FIG. 2, bottoms fraction 239 corresponds to a fuel oil product, so it may be desirable to have the bottoms fraction 239 correspond to a 700° F.+ (371° C.+) or 750° F.+ (399° C.+) fraction in order to increase the amount of distillate production. Although not shown, one or more recycle streams can also be combined with the input feed 213 into hydroconversion reaction 233, such as by recycling a portion of the total liquid effluent from hydroconversion reaction 233, a portion of the distillate fraction 217, or a combination thereof.

Bottoms fraction 338 is deasphalted 342. This generates an asphalt fraction or product 398 and a deasphalted bottoms stream 397. The deasphalted bottoms stream is then hydrotreated 356 and dewaxed 357 in the presence of hydrogen 306. This results in various low sulfur content output streams, including a lubes naphtha fraction 333, a lubes diesel fraction 337, and a lubricant base oil product 358.

Process Example 1

Processing of a Bitumen Feed

A small scale reactor was used for processing of a heavy crude oil. A 56 cm length of inch SS tubing was used as a reactor. The middle 34 cm of the reactor was held at a near-isothermal temperature of 425° C. during the course of the experiment. The volume of the hot zone was 6 cc's. The 6 cc hot zone was loaded with 80 vol % of an 80 mesh (approximately 177 μm or less) silica and 20 vol % of a commercial NiMo oxide on alumina hydrotreating catalyst. The cold zones were also filled with the same 80 mesh silica.

A feedstock comprised of 95% of a paraffin froth treated bitumen and 5% of a partially hydrogenated 1-methylnapthalene (0.97 g/cc at 60° F., 16° C.) was used for the experiment. The paraffin froth treated bitumen included 4.5 wt % sulfur, a total Ni plus V metals content of 225 ppm, and a 9 API. About 65 wt % of the paraffin froth treated bitumen corresponded to molecules with a boiling point of 800° F. (427° C.) or greater. The input feed to the reaction zone was a blend of 18 wt % of the mixture of paraffin treated bitumen and solvent, and 82 wt % of the C5+ liquid product produced by the unit.

The feedstock was pumped through the reactor at 21 cc/hr (about 3 LHSV for the 18 wt % of new feedstock relative to the 1.2 cc's of catalyst in the hot zone). Hydrogen was cofed through a mass flow controller at 42 sccm. The reactor was held at 425° C. and 800 psig. The effluent from the reactor was split into gas and liquid products at 0° F. (−18° C.) and 1 atm pressure (101 kPa) by flowing through a chilled knock-out pot. Close to 97% of the mass of the liquid feed was collected as liquid product from the knock-out pot. The dominant gas product was $H_2S$. The liquids and gasses were analyzed by conventional means. The reactor ran at constant conditions for 25 days.

After fractionation, the liquid product from the reaction included about 4% $H_2S$, about 7% $C_4$-gases, about 14% naphtha ($C_5$ to 204° C.), about 50% distillate (204° C.-427° C.), and about 25% of 427° C.+ products. The sulfur content of the 427° C.+ fraction was 1.8 wt %.

The above bitumen is believed to be a more challenging feedstock than a typical crude oil processed at a refinery. The sulfur content, metals level, and percentage of 800° F.+ (427° C.+) molecules in the bitumen are all higher than a typical crude. The results from the above experiment were then used as the basis for simulating processing of a whole crude in configurations similar to FIGS. 2 and 3.

Process Example 2

Simulated Processing of a Crude Oil

Simulations were performed for processing a crude oil based on the configurations shown in FIGS. 2 and 3. The simulations were based on a combination of empirical and kinetic models for simulating the various processes in a refinery, including the results from processing of a bitumen as described above in Example 1. The crude oil feedstock in the simulations corresponded to an existing desalted crude oil. The API gravity of the feedstock was 30.4. The sulfur content was 2.8 wt %, the nitrogen content was about 1600 wppm, and the metals content was 48 wppm of vanadium and 12 wppm of nickel for a total of 60 wppm. The boiling point profile of the desalted crude oil included a initial boiling point of 0° F. (−18° C.); a T10 of 212° F. (100° C.); a T30 of 470° F. (243° C.); a T50 of 700° F. (371° C.); and a T77 of 1050° F. (566° C.).

In one simulation, the desalted crude oil was processed in a fuels production configuration similar to the configuration shown in FIG. 2. The conditions for conversion of the 400° F.+ (204° C.+) bottoms from the initial flash tower included a pressure of 800 psig (5515 kPag), a temperature of 425° C., and an LHSV of about 3. The ratio of fresh 400° F.+ feedstock to recycled liquid product from hydroconversion was 20 to 80.

The simulation of the configuration in FIG. 2 resulted in the product details shown in Table 1.

TABLE 1

Simulation of Fuels Production

| | A | B | C | D | E | K |
|---|---|---|---|---|---|---|
| Flow, t/h | 100 | 4 | 29 | 50.5 | 14 | 2.5 |
| Sulfur, ppm | 28000 | 10 | Nil | <8 | 20,000 | |
| Nitrogen, ppm | 1600 | 10 | Nil | <8 | 30 | |
| Metals, ppm | 60 | — | — | — | 430 | |

Column A corresponds to the desalted crude feedstock. Column B is the $C_4$-light ends product. Column C is the reformed naphtha product. Column D is the combined kerosene and diesel (distillate) product. In this simulation, this corresponds to products having a boiling range from 330° F. (166° C.) to 800° F. (427° C.). Column E is an 800° F.+ (427° C.+) fuel oil product. Column K is the amount of $H_2S$ generated.

As shown in Table 1, only 4 wt % of the desalted crude oil input was lost as light ends. Thus, light ends were less than about 5 wt % of the hydroconverted effluent in the simulation. By using the atmospheric bottoms as a fuel oil, production of coke was avoided. Additionally, using the atmospheric bottoms as fuel oil reduced the amount of PNA species that were cracked and then hydrogenated to form diesel or naphtha, thus saving on hydrogen usage.

In the second simulation, the desalted crude oil was processed in a lubes production configuration similar to the configuration shown in FIG. 3. The conditions for conversion of the 400° F.+ (204° C.+) bottoms from the initial flash tower included a pressure of 800 psig (5515 kPag), a temperature of 425° C., and an LHSV of about 3.

The simulation of the configuration in FIG. 3 resulted in the product details shown in Table 2.

TABLE 2

Simulation of Lubes Production

| | A | B | C | D | F | G | H | J | K |
|---|---|---|---|---|---|---|---|---|---|
| Flow, t/h | 100 | 4 | 29 | 40 | 11 | 2 | 2 | 10 | 2.5 |
| Sulfur, ppm | 28000 | 10 | Nil | <8 | <8 | <8 | <8 | 20,000 | |

TABLE 2-continued

Simulation of Lubes Production

|               | A    | B  | C   | D  | F  | G  | H  | J   | K |
|---------------|------|----|-----|----|----|----|----|-----|---|
| Nitrogen, ppm | 1600 | 10 | Nil | <8 | <8 | <8 | <8 | 45  |   |
| Metals, ppm   | 60   | —  | —   | —  | —  | —  | —  | 600 |   |

Column A corresponds to the desalted crude feedstock. Column B is the $C_4$-light ends product. Column C is the reformed naphtha product. Column D is the combined kerosene and diesel (distillate) product. In this simulation, this corresponds to products having a boiling range from 330° F. (166° C.) to 800° F. (427° C.). Column F is the lubricant base oil product. Columns G and H correspond respectively to the distillate (650° F.-750° F.) and naphtha products generated during hydroprocessing of the deasphalted bottoms to form the lubricant base oil product. Column J is the asphalt product. Column K is the amount of $H_2S$ generated.

As shown in Table 2, only 4 wt % of the desalted crude oil input was lost as light ends. Thus, light ends were less than about 5 wt % of the hydroconverted effluent in the simulation. Again, production of coke is avoided by using the atmospheric bottoms for lubricant base oil production and asphalt production.

ADDITIONAL EMBODIMENTS

Embodiment 1

A method for processing a crude oil, comprising: separating a crude oil feedstock to form at least a naphtha fraction and a heavier crude oil fraction, a first cut point temperature for separating a lighter crude oil fraction comprising the naphtha fraction from the heavier crude oil fraction being a temperature from about 250° F. (121° C.) to about 400° F. (204° C.), the heavier crude oil fraction including a portion having a boiling point greater than 1050° F. (566° C.); hydrotreating the naphtha fraction under effective naphtha hydrotreating conditions to form a hydrotreated naphtha effluent; exposing the heavier crude oil fraction to a hydroconversion catalyst under effective hydroconversion conditions to form a hydroconverted effluent, the effective hydroconversion conditions being effective for conversion of at least about 30% of the portion of the heavier crude oil having a boiling point greater than 1050° F. (566° C.); separating the hydroconverted effluent to form at least a distillate fraction and a bottoms fraction, a second cut point temperature for separating the distillate fraction from the bottoms fraction being a temperature from about 650° F. (343° C.) to about 800° F. (427° C.); and hydrotreating the distillate fraction under effective hydrotreating conditions to form a hydrotreated distillate effluent.

Embodiment 2

The method of Embodiment 1, wherein at least one of separating the crude oil feedstock or separating the hydroconverted effluent comprises performing a separation using a flash tower or flash vessel.

Embodiment 3

The method of any of the above embodiments, wherein exposing the heavier crude oil fraction to a hydroconversion catalyst comprises exposing the heavier crude oil fraction and a recycle fraction to the hydroconversion catalyst, the recycle fraction corresponding to at least about 10 wt % of the combined heavier crude oil fraction and recycle fraction.

Embodiment 4

The method of Embodiment 3, further comprising splitting at least one of the distillate fraction or the hydrotreated distillate effluent to form a distillate fuel fraction and the recycle fraction.

Embodiment 5

The method of Embodiment 4, further comprising separating the distillate fuel fraction to form a kerosene boiling range fraction and a diesel boiling range fraction.

Embodiment 6

The method of any of the above embodiments, wherein the second cut point temperature for separating the distillate fraction from the bottoms fraction is from about 750° F. (399° C.) to about 800° F. (427° C.).

Embodiment 7

The method of any of Embodiments 1-5, further comprising: deasphalting the bottoms fraction to form a deasphalted bottoms fraction and an asphalt fraction; and exposing the deasphalted bottoms fraction to a dewaxing catalyst under effective catalytic dewaxing conditions to form a lubricant base oil fraction.

Embodiment 8

The method of Embodiment 7, further comprising hydrotreating the deasphalted bottoms to form a hydrotreated deasphalted bottoms effluent, wherein exposing the deasphalted bottoms to the dewaxing catalyst comprises exposing the hydrotreated deasphalted bottoms effluent to the dewaxing catalyst.

Embodiment 9

The method of Embodiment 7, wherein the second cut point temperature for separating the distillate fraction from the bottoms fraction is from about 650° F. (343° C.) to about 750° F. (399° C.), such as from about 650° F. (343° C.) to about 700° F. (371° C.).

Embodiment 10

The method of any of the above embodiments, wherein the hydroconversion catalyst comprises a catalyst with a median pore diameter of about 85 Å to about 120 Å, such as about 85 Å to about 100 Å.

Embodiment 11

The method of Embodiment 10, wherein at least 60% of the pore volume of the hydroconversion catalyst corresponds to pores having a diameter within 45 Å of the median pore diameter.

Embodiment 12

The method of any of the above embodiments, wherein the portion of the heavier crude oil fraction having a boiling point greater than 1050° F. (566° C.) comprises at least about 20 wt % of the crude oil feedstock.

Embodiment 13

The method of any of the above embodiments, wherein the effective hydroconversion conditions comprise a temperature of at least about 360° C., such as a temperature of from about 385° C. to about 460° C., optionally at least about 420° C., and a hydrogen partial pressure of about 1000 psia (6.9 MPa) or less, such as a hydrogen partial pressure of about 800 psia (5.5 MPa) or less.

Embodiment 14

The method of any of the above embodiments, wherein separating the crude oil feedstock comprises forming the lighter crude oil fraction that comprises the naphtha fraction, the method further comprising separating the lighter crude oil fraction to form the naphtha fraction and one or more additional fractions.

Embodiment 15

The method of any of the above embodiments, wherein separating the hydroconverted effluent further comprises forming a second naphtha fraction.

Embodiment 16

The method of Embodiment 15, wherein the second naphtha fraction is formed by separating the second naphtha fraction from a higher boiling portion of the distillate fraction using a cut point temperature corresponding to the first cut point temperature.

Embodiment 17

The method of any of the above embodiments, wherein the heavier crude oil fraction contains at least 500 wppm elemental sulfur, based on total weight of the heavy hydrocarbon oil component.

Embodiment 18

The method of any of the above embodiments, wherein the heavier crude oil fraction contains at least 5 wt % n-pentane asphaltenes, based on total weight of the heavier crude oil fraction.

Embodiment 19

The method of any of the above embodiments, wherein the hydroconverted effluent comprises about 5 wt % or less of light ends.

The principles and modes of operation of this invention have been described above with reference to various exemplary and preferred embodiments. As understood by those of skill in the art, the overall invention, as defined by the claims, encompasses other preferred embodiments not specifically enumerated herein.

The invention claimed is:

1. A method for processing a crude oil, comprising:
    separating a crude oil feedstock to form at least a naphtha fraction and a heavier crude oil fraction, a first cut point temperature for separating a lighter crude oil fraction comprising the naphtha fraction from the heavier crude oil fraction being a temperature from about 250° F. (121° C.) to about 400° F. (204° C.), the heavier crude oil fraction including a portion having a boiling point greater than 1050° F. (566° C.);
    hydrotreating the naphtha fraction under effective naphtha hydrotreating conditions to form a hydrotreated naphtha effluent;
    exposing the heavier crude oil fraction to a hydroconversion catalyst under effective hydroconversion conditions to form a hydroconverted effluent, the effective hydroconversion conditions being effective for conversion of at least about 30 wt % of the portion of the heavier crude oil having a boiling point greater than 1050° F. (566° C.);
    separating the hydroconverted effluent to form at least a distillate fraction and a bottoms fraction, a second cut point temperature for separating the distillate fraction from the bottoms fraction being a temperature from about 650° F. (343° C.) to about 800° F. (427° C.); and
    hydrotreating the distillate fraction under effective hydrotreating conditions to form a hydrotreated distillate effluent.

2. The method of claim 1, wherein separating the crude oil feedstock to form at least a naphtha fraction and a heavier crude oil fraction comprises separating the crude oil feedstock using a flash tower or flash vessel.

3. The method of claim 1, wherein separating the hydroconverted effluent to form at least a distillate fraction and a bottoms fraction comprises separating the hydroconverted effluent using a flash tower or flash vessel.

4. The method of claim 1, wherein the second cut point temperature for separating the distillate fraction from the bottoms fraction is from about 750° F. (399° C.) to about 800° F. (427° C.).

5. The method of claim 1, wherein exposing the heavier crude oil fraction to a hydroconversion catalyst comprises exposing the heavier crude oil fraction and a recycle fraction to the hydroconversion catalyst, the recycle fraction corresponding to at least about 10 wt % of the combined heavier crude oil fraction and recycle fraction.

6. The method of claim 5, further comprising splitting at least one of the distillate fraction or the hydrotreated distillate effluent to form a distillate fuel fraction and the recycle fraction.

7. The method of claim 6, further comprising separating the distillate fuel fraction to form a kerosene boiling range fraction and a diesel boiling range fraction.

8. The method of claim 1, further comprising:
    deasphalting the bottoms fraction to form a deasphalted bottoms fraction and an asphalt fraction; and
    exposing the deasphalted bottoms fraction to a dewaxing catalyst under effective catalytic dewaxing conditions to form a lubricant base oil fraction.

9. The method of claim 8, further comprising hydrotreating the deasphalted bottoms to form a hydrotreated deasphalted bottoms effluent, wherein exposing the deasphalted bottoms to the dewaxing catalyst comprises exposing the hydrotreated deasphalted bottoms effluent to the dewaxing catalyst.

10. The method of claim 8, wherein the second cut point temperature for separating the distillate fraction from the bottoms fraction is from about 650° F. (343° C.) to about 750° F. (399° C.).

11. The method of claim 1, wherein the hydroconversion catalyst comprises a catalyst with a median pore diameter of about 85 Å to about 120 Å.

12. The method of claim 11, wherein at least 60% of the pore volume of the hydroconversion catalyst corresponds to pores having a diameter within 45 Å of the median pore diameter.

13. The method of claim 1, wherein the portion of the heavier crude oil fraction having a boiling point greater than 1050° F. (566° C.) comprises at least about 20 wt % of the crude oil feedstock.

14. The method of claim 1, wherein the effective hydroconversion conditions comprise a temperature of at least about 360° C. and a hydrogen partial pressure of about 1000 psia (6.9 MPa) or less.

15. The method of claim 1, wherein separating the crude oil feedstock comprises forming the lighter crude oil fraction that comprises the naphtha fraction, the method further comprising separating the lighter crude oil fraction to form the naphtha fraction and one or more additional fractions.

16. The method of claim 1, wherein separating the hydroconverted effluent further comprises forming a second naphtha fraction.

17. The method of claim 16, wherein the second naphtha fraction is formed by separating the second naphtha fraction from a higher boiling portion of the distillate fraction using a cut point temperature corresponding to the first cut point temperature.

18. The method of claim 1, wherein the heavier crude oil fraction contains at least 500 wppm elemental sulfur, based on total weight of the heavy hydrocarbon oil component.

19. The method of claim 1, wherein the heavier crude oil fraction contains at least 5 wt % n-pentane asphaltenes, based on total weight of the heavier crude oil fraction.

20. The method of claim 1, wherein the hydroconverted effluent comprises about 5 wt % or less of light ends.

* * * * *